US012795254B2

(12) United States Patent
Kim et al.

(10) Patent No.: US 12,795,254 B2
(45) Date of Patent: Nov. 10, 2026

(54) IMAGE SENSOR INCLUDING PIXEL ARRAY INCLUDING SHARED CAPACITOR

(71) Applicant: Samsung Electronics Co., Ltd., Suwon-si (KR)

(72) Inventors: Seoksan Kim, Suwon-si (KR); Minwoong Seo, Suwon-si (KR); Jaekyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 18/971,297

(22) Filed: Dec. 6, 2024

(65) Prior Publication Data

US 2025/0211869 A1 Jun. 26, 2025

(30) Foreign Application Priority Data

Dec. 20, 2023 (KR) ........................ 10-2023-0187526

(51) Int. Cl.

| | |
|---|---|
| ***H04N 25/532*** | (2023.01) |
| ***H04N 25/59*** | (2023.01) |
| ***H04N 25/77*** | (2023.01) |
| ***H04N 25/771*** | (2023.01) |

(52) U.S. Cl.

CPC ........... *H04N 25/532* (2023.01); *H04N 25/59* (2023.01); *H04N 25/77* (2023.01); *H04N 25/771* (2023.01)

(58) Field of Classification Search

None

See application file for complete search history.

(56) References Cited

U.S. PATENT DOCUMENTS

| | | | | |
|---|---|---|---|---|
| 10,263,021 | B2 | 4/2019 | Raynor | |
| 10,277,848 | B2 | 4/2019 | Sakakibara et al. | |
| 11,089,252 | B2 | 8/2021 | Lalanne et al. | |
| 11,095,842 | B2 | 8/2021 | Mabuchi et al. | |
| 11,750,942 | B2 | 9/2023 | Lee | |
| 2018/0227530 | A1* | 8/2018 | Gomi | H04N 25/77 |
| 2022/0094864 | A1* | 3/2022 | Lee | H04N 25/78 |
| 2022/0191416 | A1 | 6/2022 | Fowler | |
| 2024/0089639 | A1* | 3/2024 | Zuo | H04N 25/616 |

FOREIGN PATENT DOCUMENTS

| | | | |
|---|---|---|---|
| CN | 115985925 | A | 4/2023 |
| KR | 10-2023-0006674 | A | 1/2023 |

* cited by examiner

*Primary Examiner* — Paul M Berardesca

(74) *Attorney, Agent, or Firm* — FISH & RICHARDSON P.C.

(57) ABSTRACT

Provided is an image sensor including a pixel array including a shared capacitor. An image sensor includes a first pixel and a second pixel, wherein the first pixel may include a first photodiode, a first floating diffusion node, a first global selection transistor, a first capacitor, a first sampling transistor, a second capacitor, and a second sampling transistor, the second pixel may include a second photodiode, a second floating diffusion node, a second global selection transistor, a third capacitor, a third sampling transistor, a fourth capacitor, and a fourth sampling transistor, and the image sensor may further include a shared transistor including a first end connected to a first output node and a second end connected to a second output node.

20 Claims, 13 Drawing Sheets

IMAGE SENSOR INCLUDING PIXEL ARRAY INCLUDING SHARED CAPACITOR

CROSS-REFERENCE TO RELATED APPLICATION

This application is based on and claims priority under 35 U.S.C. § 119 to Korean Patent Application No. 10-2023-0187526, filed on Dec. 20, 2023, in the Korean Intellectual Property Office, the disclosure of which is incorporated by reference herein in its entirety.

BACKGROUND

The present inventive concepts relate to image sensors, and more specifically, to image sensors including a pixel array in which a plurality of rows include a shared capacitor.

Image sensors are apparatuses that capture a two-dimensional or three-dimensional image of an object. Image sensors create an image of an object by using a photoelectric conversion device that reacts according to the intensity of light reflected from the object. Recently, with the development of the computer industry and the communication industry, there is an increasing demand for image sensors with improved performance for use in various electronic devices, such as digital cameras, camcorders, personal communication systems (PCSs), game devices, security cameras, medical micro cameras, mobile phones, etc.

Image sensors may have increased resolution by including a plurality of pixels. As the size of each pixel is gradually decreased, a pixel structure for efficiently increasing the capacitance of a floating diffusion node may be required or advantageous.

SUMMARY

The present inventive concepts provide an image sensors including a pixel array capable of increasing the capacitance of a floating diffusion node by using a shared capacitor.

According to some example embodiments, there is an image sensor comprising a pixel array including a first pixel and a second pixel. The first pixel may include a first photodiode, a first floating diffusion node configured to accumulate photocharges generated from the first photodiode, a first global selection transistor including a first end connected to a first node and a second end connected to a first output node, a first capacitor configured to store signal charges corresponding to a voltage of the first floating diffusion node configured to accumulate the photocharges, a first sampling transistor including a first end connected to the first output node and a second end connected to the first capacitor, a second capacitor configured to store reset charges corresponding to a voltage of the first floating diffusion node that has been reset, and a second sampling transistor including a first end connected to the first output node and a second end connected to the second capacitor. The second pixel may include a second photodiode, a second floating diffusion node configured to accumulate photocharges generated from the second photodiode, a second global selection transistor including a first end connected to a first node and a second end connected to a second output node, a third capacitor configured to store reset charges corresponding to a voltage of the second floating diffusion node that has been reset, a third sampling transistor including a first end connected to the second output node and a second end connected to the third capacitor, a fourth capacitor configured to store signal charges corresponding to a voltage of the second floating diffusion node configured to accumulate the photocharges, and a fourth sampling transistor including a first end connected to the second output node and a second end connected to the fourth capacitor, and the pixel array may comprise a shared transistor including a first end connected to the first output node and a second end connected to the second output node.

According to some example embodiments, there is a pixel array comprising a first pixel and a second pixel. The first pixel may include a first photodiode, a first floating diffusion node configured to accumulate photocharges generated from the first photodiode, a first sampling transistor configured to store, in a first capacitor, charges corresponding to a voltage of the first floating diffusion node configured to accumulate the photocharges, the first sampling transistor including a first end connected to a first output node, and a second sampling transistor configured to store, in a second capacitor, charges corresponding to a voltage of the first floating diffusion node that has been reset, the second sampling transistor including a first end connected to the first output node. The second pixel may include a second photodiode, a second floating diffusion node configured to accumulate photocharges generated from the second photodiode, a third sampling transistor configured to store, in a third capacitor, charges corresponding to a voltage of the second floating diffusion node that has been reset, the third sampling transistor including a first end connected to a second output node, and a fourth sampling transistor configured to store, in a fourth capacitor, charges corresponding to a voltage of the second floating diffusion node configured to accumulate the photocharges, the fourth sampling transistor including a first end connected to the second output node, and the pixel array may further include a shared transistor including a first end connected to the first output node and a second end connected to the second output node.

According to some example embodiments, there is an image sensor comprising a pixel array including a first pixel and a second pixel, the first pixel in an $n^{th}$ row of the pixel array (n being a natural number), and the second pixel in an $(n+1)^{th}$ row of the pixel array. The first pixel may include a first floating diffusion node configured to accumulate photocharges generated from a first photodiode, a first global selection transistor including a first end connected to a first node and a second end connected to a first output node, a first capacitor configured to store signal charges corresponding to a voltage of the first floating diffusion node configured to accumulate the photocharges, a first sampling transistor including a first end connected to the first output node and a second end connected to the first capacitor, a second capacitor configured to store reset charges corresponding to a voltage of the first floating diffusion node that has been reset, and a second sampling transistor including a first end connected to the first output node and a second end connected to the second capacitor. The second pixel may include a second floating diffusion node configured to accumulate photocharges generated from a second photodiode, a second global selection transistor including a first end connected to the first node and a second end connected to a second output node, a third capacitor configured to store reset charges corresponding to a voltage of the second floating diffusion node that has been reset, a third sampling transistor including a first end connected to the second output node and a second end connected to the third capacitor, a fourth capacitor configured to store signal charges corresponding to a voltage of the second floating diffusion node configured to accumulate the photocharges, and a fourth sampling transistor including a first end connected to the second output node and a second end connected to the fourth capacitor, and the pixel array may include a shared transistor including a first end connected to the first output node and a second end connected to the second output node.

BRIEF DESCRIPTION OF THE DRAWINGS

Example embodiments will be more clearly understood from the following detailed description taken in conjunction with the accompanying drawings in which.

DETAILED DESCRIPTION

Figure 1:
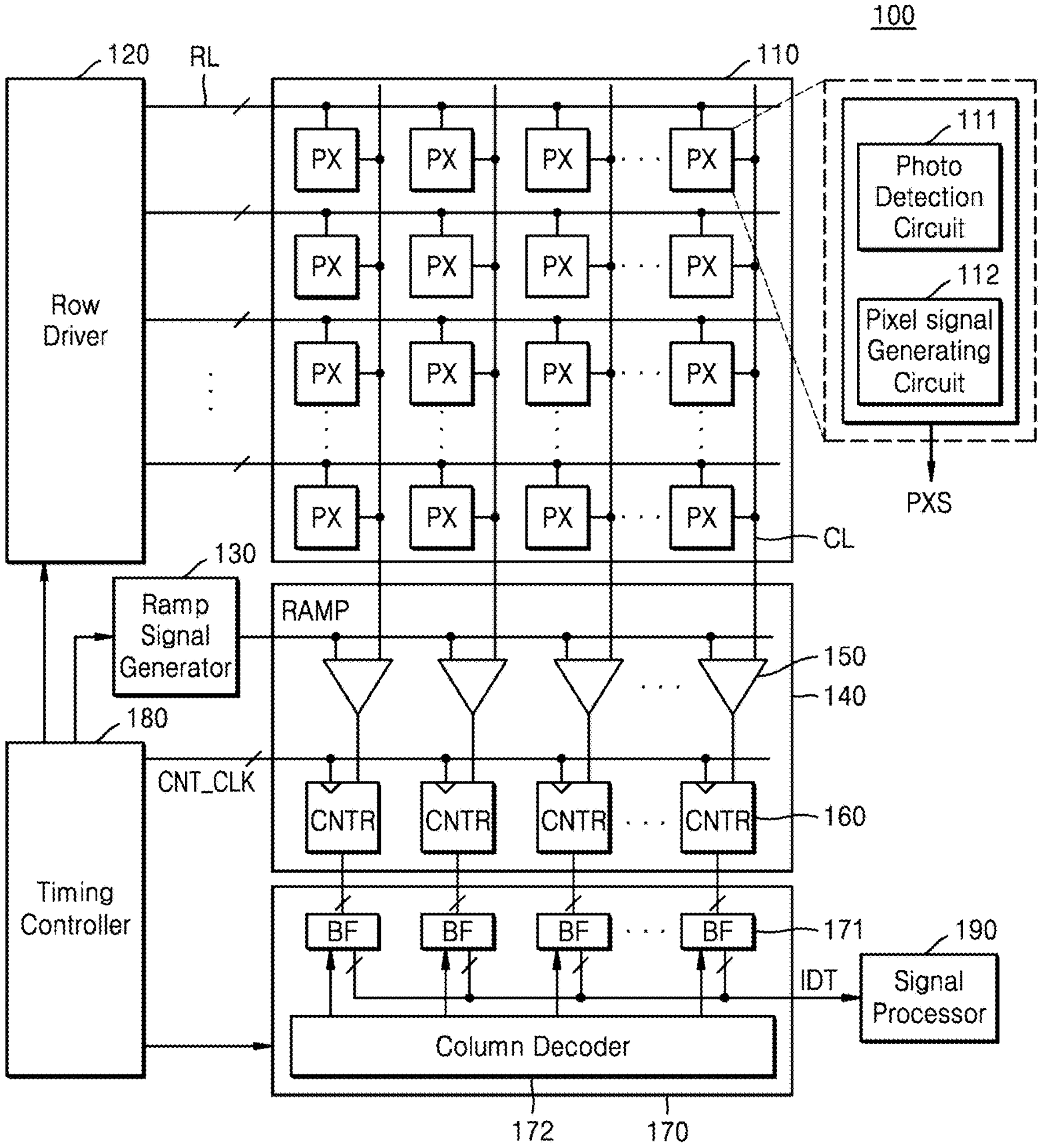
FIG. 1 is a block diagram illustrating an image sensor according to some example embodiments.

Hereinafter, some embodiments of the present inventive concepts will be described in detail with reference to the accompanying drawings.

Accordingly, the drawings and description are to be regarded as illustrative in nature and not restrictive. Like reference numerals designate like elements throughout the specification. The sequence of operations or steps are not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

FIG. 1 is a block diagram illustrating an image sensor 100 according to some example embodiments.

The image sensor 100 may be mounted in an electronic device having an image or light sensing function. For example, the image sensor 100 may be mounted in an electronic device such as a camera, a smartphone, a wearable device, an Internet of Things (IoT) device, a household appliance, a tablet personal computer (PC), a personal digital assistant (PDA), a portable multimedia player (PMP), a navigation device, a drone, an advanced drivers assistance system (ADAS), etc., but example embodiments are not limited thereto. In some example embodiments, the image sensor 100 may be mounted on an electronic device that is provided as a component in vehicles, furniture, manufacturing facilities, doors, and various measuring devices.

Referring to FIG. 1, the image sensor 100 may include a pixel array 110, a row driver 120, a ramp signal generator 130, an analog-to-digital conversion circuit 140 (hereinafter, referred to as an ADC circuit), a data output circuit 170, and a timing controller 180. The image sensor 100 may further include a signal processor 190. A configuration including the ramp signal generator 130, the ADC circuit 140, and the data output circuit 170 may be referred to as a readout circuit.

The pixel array 110 includes a plurality of row lines RL, a plurality of column lines CL, and a plurality of pixels PX connected to the plurality of row lines RL and the plurality of column lines CL and arranged in a matrix. The plurality of pixels PX may be active pixel sensors (APSs).

Each of the plurality of pixels PX may include at least one photoelectric conversion device, and each pixel PX may detect light by using the at least one photoelectric conversion device and output an image signal, for example an electrical signal, according to the detected light. For example, a photoelectric conversion device may include a photodiode, a phototransistor, a photogate, or a pinned photodiode.

Each of the plurality of pixels PX may detect light in a certain spectral range. For example, the plurality of pixels PX may include red pixels converting light in a red spectral region into an electrical signal, green pixels converting light in a green spectral range into an electrical signal, and blue pixels converting light in a blue spectral range into an electrical signal. In some example embodiments, the plurality of pixels PX may have a color arrangement of a Bayer pattern. However, example embodiments are not limited thereto, and the plurality of pixels PX may further include white pixels. In some example embodiments, the plurality of pixels PX may include pixels combined with another color configuration, for example, yellow pixels, cyan pixels, and magenta pixels.

A color filter array for penetrating light in a certain spectral range may be arranged on the upper portions of the plurality of pixels PX, and according to the color filters respectively arranged on the upper portions of the plurality of pixels PX, colors that the corresponding pixels PX may detect may be determined. However, the present inventive concepts are not limited thereto. In some example embodiments, a certain photoelectric conversion device may convert light in a certain wavelength band into an electrical signal according to the level of the electrical signal applied to the photoelectric conversion device.

In some example embodiments, each of the plurality of pixels PX has a pixel structure that may operate according to a global shutter method, and the pixel array 110 may operate according to the global shutter method. According to the global shutter method, the plurality of pixels PX of the pixel array 110 have the same exposure start time point and the same exposure period, and after the exposure period, a plurality of rows of the pixel array 110 may be sequentially read.

Each of the plurality of pixels PX may include a photo detection circuit 111 and a pixel signal generating circuit 112. The photo detection circuit 111 may include a photo-sensing device and may convert an externally detected optical signal into an electrical signal, for example, a detection signal that is an analog signal. The detection signal may include a detection signal according to a reset operation of the photo detection circuit 111 and may include a detection signal according to a photo detection operation of the photo detection circuit 111.

The pixel signal generating circuit 112 may receive a detection signal and generate a pixel signal PXS corresponding to the detection signal, and may output the pixel signal PXS via a column line. The pixel signal generating circuit 112 may include a shared capacitor therein and may store an amount of charge corresponding to a detection signal in the shared capacitor. For example, the pixel signal generating circuit 112 may include a first capacitor in which charges corresponding to a photo detection operation are accumulated, and may include a second capacitor in which charges corresponding to a reset operation are accumulated. Because each pixel PX includes the first capacitor and the second capacitor, photo charge accumulation time points of the pixels PX arranged in different rows may be controlled to be the same.

In some example embodiments, each of the plurality of pixels PX may have a dual conversion gain. The dual conversion gain includes a low conversion gain and a high conversion gain. According to some example embodiments, the conversion gain refers to a rate at which charges accumulated in a floating diffusion node FD (in FIG. 3) are converted into a voltage. Charges generated by a photoelectric conversion device may be transferred to and accumulated in the floating diffusion node FD, and the charges accumulated in the floating diffusion node FD may be converted into a voltage according to the conversion gain. At this time, the conversion gain may vary according to the capacitance of the floating diffusion node FD, wherein, when the capacitance increases, the conversion gain may decrease, and when the capacitance decreases, the conversion gain may increase.

The structure of each pixel PX according to some example embodiments are described in detail with reference to FIGS. 3 and 4. In some example embodiments, a structure in which the pixel array according to the present inventive concepts includes the shared capacitor is described in detail with reference to FIGS. 5 to 7.

The row driver 120 drives the pixel array 110 on a row-by-row basis. The row driver 120 may decode a row control signal (for example, an address signal) received from the timing controller 180 and may select at least one row line among row lines forming the pixel array 110 in response to the decoded row control signal. For example, the row driver 120 may generate a selection signal for selecting one of the plurality of rows. In some example embodiments, the pixel array 110 outputs a pixel signal, for example, a pixel voltage, from a row selected by the selection signal provided from the row driver 120. The pixel signal may include a reset signal and an image signal. The row driver 120 may transmit control signals for outputting a pixel signal to the pixel array 110, and each pixel PX may output the pixel signal by operating in response to the control signals.

The ramp signal generator 130 may generate a ramp signal RAMP (for example, a ramp voltage) of which the level rises or falls with a predetermined slope under control by the timing controller 180. The ramp signal RAMP may be provided to each of a plurality of correlated double sampling (CDS) circuits 150 provided in the ADC circuit 140.

The ADC circuit 140 may include the plurality of CDS circuits 150 and a plurality of counters 160. The ADC circuit 140 may convert a pixel signal (for example, a pixel voltage) input from the pixel array 110 into a pixel value that is a digital signal. Each pixel signal received via each of the plurality of column lines CL is converted into a pixel value that is a digital signal by each CDS circuit 150 and each counter 160.

Each CDS circuit 150 may compare a pixel signal, for example, a pixel voltage, received via each column line CL with the ramp signal RAMP and may output a result of the comparison as a comparison result signal. When the level of the ramp signal RAMP is the same as the level of the pixel signal, each CDS circuit 150 may output a comparison signal that transitions from a first level (for example, logic high) to a second level (for example, logic low). A time point at which the level of the comparison signal transitions may be determined according to the level of the pixel signal. Hereinafter, for convenience of explanation, the first level is referred to as a high level, and the second level is referred to as a low level.

Each CDS circuit 150 may sample a pixel signal provided from each pixel PX according to a CDS method. Each CDS circuit 150 may sample a reset signal received as the pixel signal, compare the reset signal with the ramp signal RAMP, and generate a comparison signal according to the reset signal. Afterwards, each CDS circuit 150 may sample an image signal correlated with the reset signal, compare the image signal with the ramp signal RAMP, and generate a comparison signal according to the image signal.

Each counter 160 may count a level transition time point of a comparison result signal output from each CDS circuit 150, based on a counting clock CNT_CLK provided from the timing controller 180, and may output a count value.

In some example embodiments, each counter 160 may be implemented as an operational circuit and an up-counter that sequentially increases a count value based on the counting clock CNT_CLK, or may include an up/down counter or a bit-wise inversion counter.

In some example embodiments, the image sensor 100 may further include a counting code generator that generates a counting code (for example, a gray code), the value of which varies periodically, and provides the counting code to each of the plurality of counters 160, and each counter 160 may include a latch circuit and an operational circuit. The latch circuit may latch a code value of a counting code at a time point at which the level of a counting comparison signal transitions. The latch circuit may latch each of a code value, for example, a reset value, corresponding to a reset signal, and a code value, for example, an image signal value, corresponding to an image signal. The operational circuit may calculate a reset value and an image signal value and generate an image signal value from which a reset level of each pixel PX has been removed. Each counter 160 may output, as a pixel value, the image signal value from which the reset level has been removed.

The data output circuit 170 may temporarily store a pixel value output from the ADC circuit 140, and then output the pixel value. The data output circuit 170 may include a plurality of column memories 171 (or referred to as a buffer (BF)) and a column decoder 172. Each column memory 171 stores a pixel value received from a corresponding counter 160. In some example embodiments, each of the plurality of column memories 171 may be provided in each counter 160. A plurality of pixel values stored in the plurality of column memories 171 may be output as image data IDT under control by the column decoder 172.

The timing controller 180 may output a control signal to each of the row driver 120, the ramp signal generator 130, the ADC circuit 140, and the data output circuit 170 and control operations or timings of the row driver 120, the ramp signal generator 130, the ADC circuit 140, and the data output circuit 170.

The signal processor 190 may perform, on the image data IDT, noise (ing processing, gain adjustment, waveform shaping processing, interpolation processing, white balance processing, gamma processing, edge emphasis processing, binning, etc., but example embodiments are not limited thereto. In some example embodiments, the signal processor 190 may be provided in an external processor located outside the image sensor 100.

The image sensor 100 according to the present inventive concepts may operate in a plurality of operation modes according to illuminance. In each of the pixels PX, the equivalent capacitance of a floating diffusion node in which charges corresponding to an optical signal are accumulated may vary according to an operation mode. For example, in a high-illuminance environment, the image sensor 100 may relatively increase the equivalent capacitance of a floating diffusion node by electrically connecting a pixel connected to an $n^{th}$ row, where n is a natural number, of the pixel array 110 with a pixel connected to an $(n+1)^{th}$ row by using a shared capacitor. Alternatively, for example, in a low-illuminance environment, the image sensor 100 may relatively reduce the equivalent capacitance of the floating diffusion node by electrically isolating the pixel connected to the $n^{th}$ row of the pixel array 110 from the pixel connected to the $(n+1)^{th}$ row by using the shared capacitor.

Figure 2:
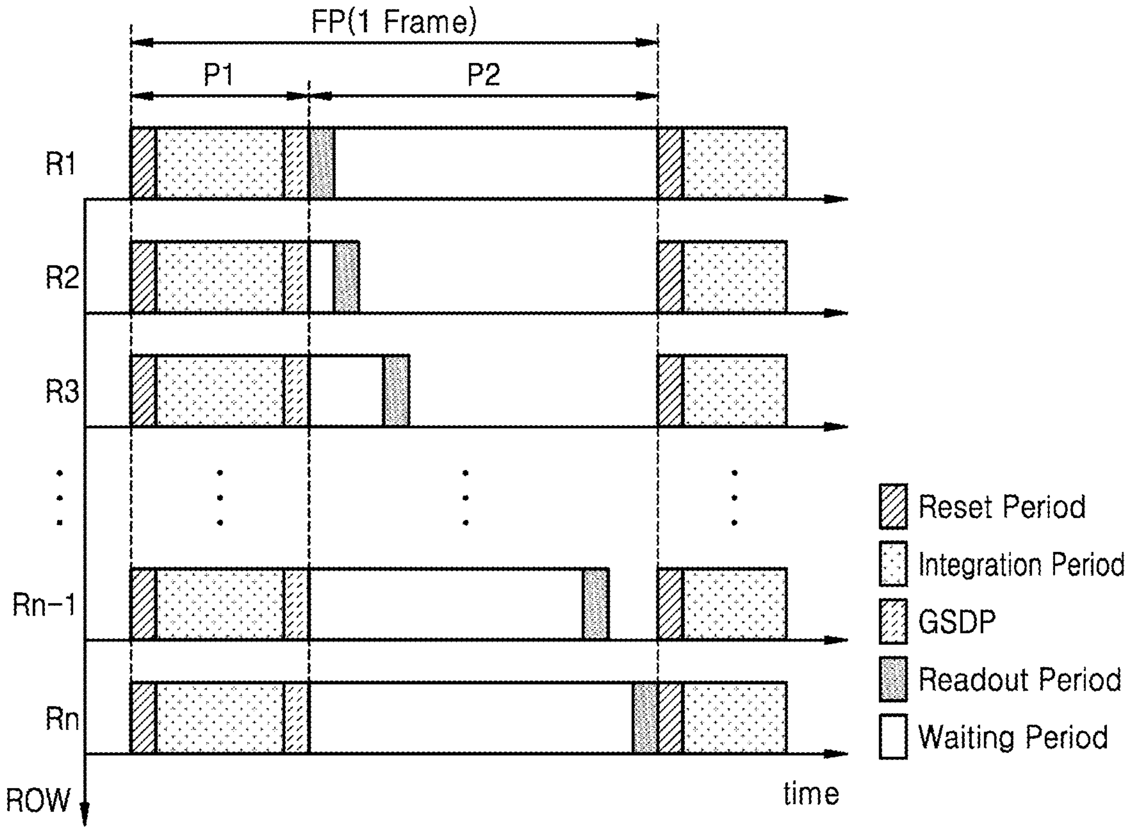
FIG. 2 is a diagram illustrating an operation of a global shutter mode of an image sensor, according to some example embodiments.

FIG. 2 is a diagram illustrating an operation of a global shutter mode of an image sensor, according to some example embodiments.

Referring to FIGS. 1 and 2, the image sensor 100 may operate in the global shutter mode.

One frame period FP may include a first period P1 and a second period P2, wherein, during the first period P1, the plurality of pixels PX of the pixel array 110, for example, the plurality of rows (for example, a first row R1 to an $n^{th}$ row Rn) of the pixel array 110, may simultaneously perform a reset operation, an exposure operation, and a global signal dumping operation, and during the second period P2, the plurality of rows of the pixel array 110 may sequentially perform a read operation. The second period P2 may be referred to as a frame readout period.

The first period P1 may include a reset period, an integration period, and a global signal dumping period GSDP. The plurality of pixels PX may perform, during the reset period, a reset operation to remove charges accumulated in a photodiode (and a floating diffusion node), perform, during the integration period, an accumulation operation to accumulate photocharges generated by the photodiode and corresponding to a received optical signal, and store, during the global signal dumping period GSDP, a reset signal according to a reset level of the floating diffusion node, and an image signal corresponding to the photocharges accumulated in the photodiode, respectively in at least two capacitors provided therein.

During the second period P2, a rolling readout operation, in which a readout operation performed during a readout period is performed sequentially by row, may be performed. For example, after a readout operation is performed on the first row R1 of the pixel array 110, a readout operation may be performed on the second row R2, which is the next sequence. Then, after the readout operation is performed on the second row R2, a readout operation may be performed on the third row R3, which is the next sequence. During the readout operation, the reset signal and the image signal respectively stored in the at least two capacitors during the global signal dumping period GSDP may be output, as pixel signals, from each pixel PX.

Figure 3:
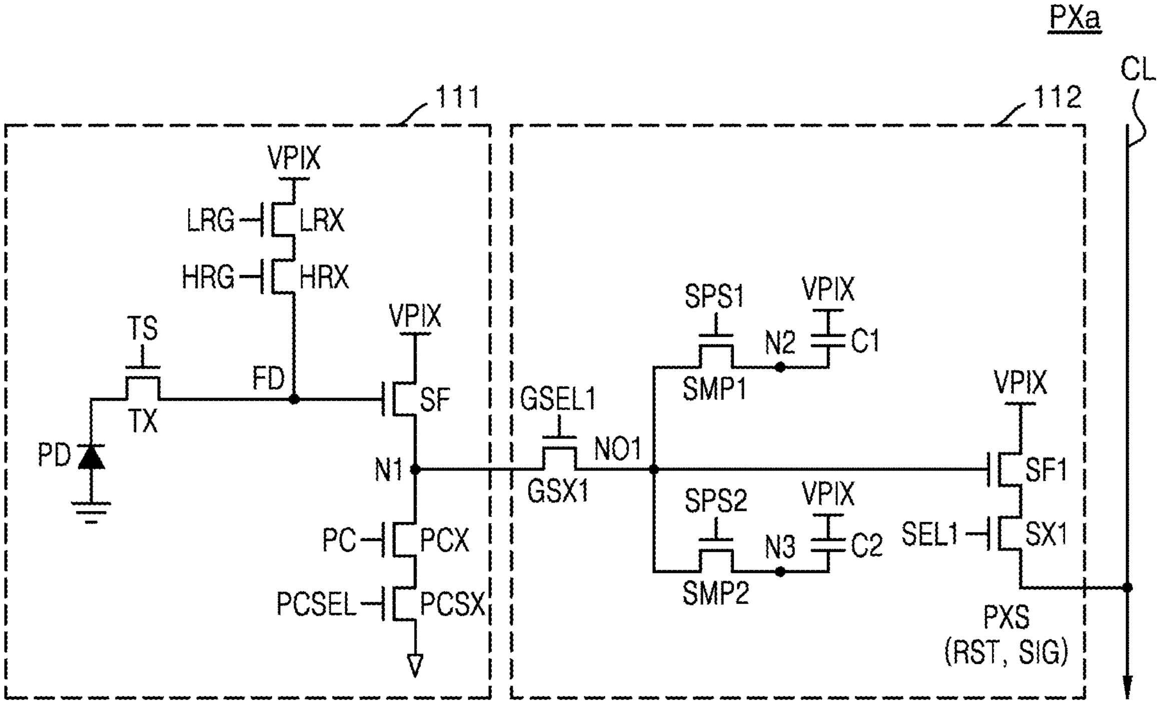
FIGS. 3 and 4 are circuit diagrams of pixels according to some example embodiments.
Figure 4:
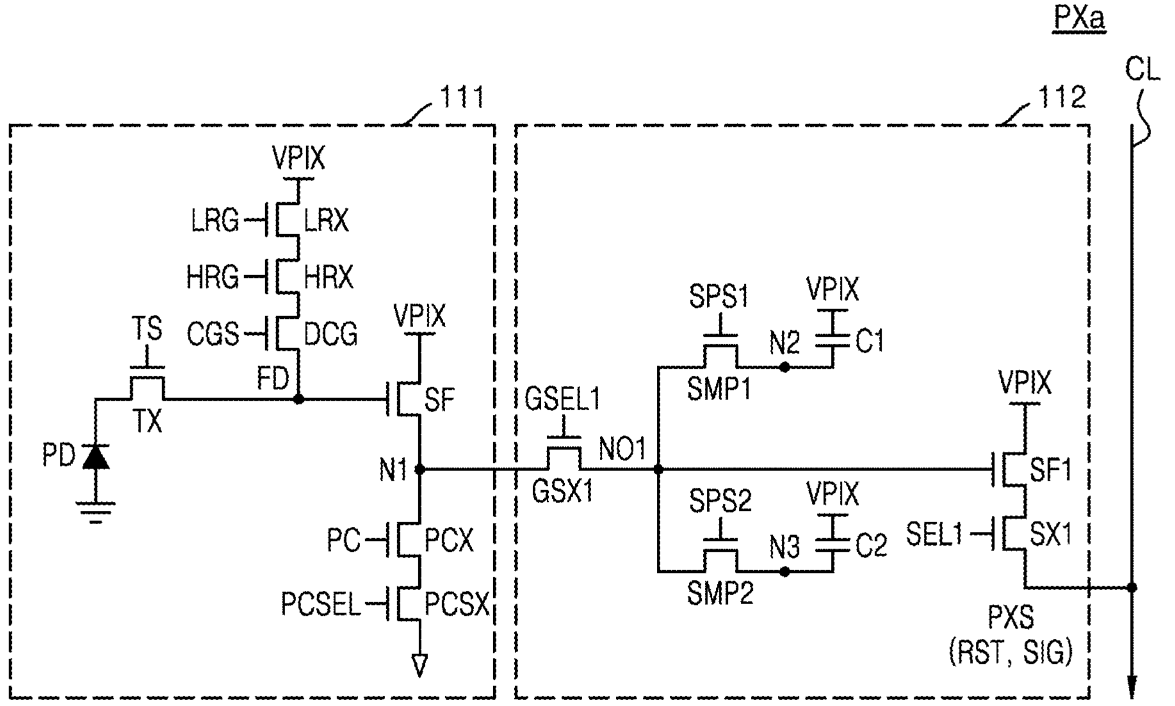

FIGS. 3 and 4 are circuit diagrams illustrating a portion of a pixel PXa according to some example embodiments.

Hereinafter, in order to clearly explain the present inventive concepts, the structure and operation of each pixel PX in FIG. 1 are described based on an example circuit diagram, but the present inventive concepts are not limited thereto, and each pixel PX may be modified into various forms.

The photo detection circuit 111 described with reference to FIG. 3 is an example of the photo detection circuit 111 in FIG. 1, and the pixel signal generating circuit 112 described with reference to FIG. 3 is an example of the pixel signal generating circuit 112 in FIG. 1.

Referring to FIG. 3, each pixel PX may include a photodiode PD and the pixel signal generating circuit 112 that generates the pixel signal PXS. Control signals TS, LRG, HRG, PC, PCSEL, GSEL1, SMP1, SMP2, and SEL1 applied to the pixel signal generating circuit 112 may be some of control signals generated from a row driver (for example, the row driver 120 in FIG. 1).

Referring to FIG. 3, the pixel PXa may include the photo detection circuit 111 and the pixel signal generating circuit 112. The photo detection circuit 111 may include the photodiode PD, a transfer transistor TX, a first reset transistor LRX, a second reset transistor HRX, a source follower SF, a precharge transistor PCX, and a precharge selection transistor PCSX. The photodiode PD may be replaced with another photoelectric conversion device.

The photodiode PD may generate photocharges that vary according to the intensity of incident light. For example, the photodiode PD may generate charges, for example, negatively charged electrons and positively charged holes, in proportion to the amount of incident light. The photodiode PD is an example of a photoelectric conversion device, and may be at least one of a phototransistor, a photogate, a pinned photodiode (PPD), and a combination thereof.

The transfer transistor TX may be connected between the photodiode PD and the floating diffusion node FD. A first terminal of the transfer transistor TX may be connected to an output end of the photodiode PD, and a second terminal of the transfer transistor TX may be connected to the floating diffusion node FD. The transfer transistor TX may be turned on or turned off in response to a transfer control signal TS output from the row driver 120 (in FIG. 1). The transfer transistor TX may be turned on and transmit photocharges generated from the photodiode PD to the floating diffusion node FD.

The first reset transistor LRX and the second reset transistor HRX may reset charges accumulated in the floating diffusion node FD. A pixel voltage VPIX may be applied to a first terminal of the first reset transistor LRX, and a second terminal of the first reset transistor LRX may be connected to a first terminal of the second reset transistor HRX. A second terminal of the second reset transistor HRX may be connected to the floating diffusion node FD. The first reset transistor LRX and the second reset transistor HRX may be turned on or turned off in response to a first reset control signal LRG and a second reset control signal HRG, which are output from the row driver 120 (in FIG. 1).

Referring to FIGS. 3 and 4 together, the photo detection circuit 111 may further include a conversion gain control transistor DCG.

The conversion gain control transistor DCG may adjust a conversion gain of the pixel PXa. regarding some example embodiments, the conversion gain refers to a rate at which charges accumulated in the floating diffusion node FD are converted into a voltage. The conversion gain may vary according to the capacitance of the floating diffusion node FD, wherein, when the capacitance increases, the conversion gain may decrease, and when the capacitance decreases, the conversion gain may increase.

The conversion gain control transistor DCG may be turned on or turned off in response to a gain control signal CGS, wherein, when the conversion gain control transistor DCG is turned on, the capacitance of the floating diffusion node FD increases such that the conversion gain decreases, and when the conversion gain control transistor DCG is turned off, the capacitance of the floating diffusion node FD decreases such that the conversion gain increases. Therefore, according to whether the conversion gain control transistor DCG is turned on/off, the pixel PXa may operate in a high conversion gain (HCG) mode or a low conversion gain (LCG) mode. In other words, the pixel PXa may operate in a dual conversion gain mode, and the dual conversion gain mode may be determined according to whether the conversion gain control transistor DCG is turned on/off. When the first reset transistor LRX, the second reset transistor HRX, and the conversion gain control transistor DCG are turned on, charges accumulated in the floating diffusion node FD may be discharged such that the floating diffusion node FD may be reset.

The source follower SF may buffer a signal according to the amount of charge charged in the floating diffusion node FD. The source follower SF may be a buffer amplifier. The pixel voltage VPIX may be applied to a first terminal of the source follower SF, and a second terminal of the source follower SF may be connected to a first node N1. According to the amount of charge accumulated in the floating diffusion node FD, the potential of the floating diffusion node FD varies, and according to the variation in the potential of the floating diffusion node FD, the source follower SF may amplify the potential variation at the floating diffusion node FD and output a result of the amplification to the first node N1. According to a potential due to photocharges accumulated in the floating diffusion node FD, the source follower SF may transmit a detection signal DS to the first node N1.

The photo detection circuit 111 may include a plurality of transistor, for example, the precharge transistor PCX and the precharge selection transistor PCSX, for operating the source follower SF and precharging a first output node NO1.

A first terminal of the precharge transistor PCX may be connected to the first node N1, and a second terminal of the precharge transistor PCX may be connected to the precharge selection transistor PCSX. For example, the precharge transistor PCX may precharge the first node N1 according to a precharge control signal PC output from the row driver 120 (in FIG. 1).

A first terminal of the precharge selection transistor PCSX may be connected to the precharge transistor PCX, and a ground voltage may be applied to a second terminal of the precharge selection transistor PCSX. The precharge selection transistor PCSX may be turned on or turned off in response to a precharge selection control signal PCSEL output from the row driver 120 (in FIG. 1). The precharge selection transistor PCSX may be turned on and provide a ground voltage to the second terminal of the precharge transistor PCX. The precharge transistor PCX may operate as a current source and generate a load current according to the precharge control signal PC, and the source follower SF may operate according to the load current.

FIGS. 3 and 4 illustrate that the pixel PXa includes one precharge selection transistor PCSX, but the present inventive concepts are not limited thereto. The pixel PXa is a transistor for precharging the first output node NO1 based on a voltage of the first node N1, and may include various numbers of precharge selection transistors.

The pixel signal generating circuit 112 may include a first global selection transistor GSX1, a first sampling transistor SMP1, a second sampling transistor SMP2, and a first source follower SF1.

A first terminal of the first global selection transistor GSX1 may be connected to the first node N1, and a second terminal of the first global selection transistor GSX1 may be connected to the first output node NO1. For example, the first output node NO1 may operate as a sensing node. The first global selection transistor GSX1 may be turned on or turned off in response to a first global selection signal GSEL1 output from the row driver 120 (in FIG. 1).

When the pixel PXa operates in the global shutter mode, the first sampling transistor SMP1, the second sampling transistor SMP2, a first capacitor C1, and a second capacitor C2 may operate as sampling circuits for sampling a first voltage (for example, a reset voltage) and a second voltage (for example, an image voltage), which are output via the first node N1.

A first terminal of the first sampling transistor SMP1 may be connected to the first output node NO1, and a second terminal of the first sampling transistor SMP1 may be connected to a second node N2. A first terminal of the first capacitor C1 may be connected to the second node N2, the pixel voltage VPIX may be applied to a second terminal of the first capacitor C1. In some example embodiments, a ground voltage may be applied to the second terminal of the first capacitor C1. The first sampling transistor SMP1 may be turned on or turned off in response to a first sampling control signal SPS1, and may be turned on to connect the first capacitor C1 with the first output node NO1.

A first terminal of the second sampling transistor SMP2 may be connected to the first output node NO1, and a second terminal of the second sampling transistor SMP2 may be connected to a third node N3. A first terminal of the second capacitor C2 may be connected to the third node N3, and the pixel voltage VPIX may be applied to a second terminal of the second capacitor C2. In some example embodiments, a ground voltage may be applied to the second terminal of the second capacitor C2. The second sampling transistor SMP2 may be turned on or turned off in response to a second sampling control signal SPS2, and may be turned on to connect the second capacitor C2 with the first output node NO1.

A reset voltage according to a reset operation or an image voltage according to the photocharges accumulated in the photodiode PD may be sampled from each of the first capacitor C1 and the second capacitor C2.

During the global signal dumping period GSDP (in FIG. 2), the precharge selection transistor PCSX may be in an on state. At this time, during a period in which the first sampling transistor SMP1 is in an on state, charges may be accumulated in the first capacitor C1, and a reset voltage RST may be sampled from (or stored in) the first capacitor C1. Afterwards, during a period in which the second sampling transistor SMP2 is in an on state, charges may be accumulated in the second capacitor C2, and an image voltage SIG may be sampled from (or stored in) the second capacitor C2.

The pixel voltage VPIX may be applied to a first terminal of the first source follower SF1, and a second terminal of the first source follower SF1 may be connected to a first selection transistor SX1. The first source follower SF1 may amplify a potential variation at the first output node NO1 and output a result of the amplification.

A first terminal of the first selection transistor SX1 may be connected to the first selection transistor SX1, and a second terminal of the first selection transistor SX1 may be connected to a column line CL. The first selection transistor SX1 may be turned on or turned off in response to a first selection control signal SEL1.

When the pixel PXa operates in the global shutter mode, the first selection transistor SX1 may be turned on during a readout period of the pixel PXa such that the first source follower SF1 may output, for example, the reset voltage RST or the image voltage SIG, as the pixel signal PXS, to the column line CL.

For example, when the first selection transistor SX1 is in an on state, the first sampling transistor SMP1 is in a turn-on state, and the second sampling transistor SMP2 is in a turn-off state, the reset voltage RST sampled from the first capacitor C1 may be output as the pixel signal PXS, and when the first selection transistor SX1 is in an on state, the second sampling transistor SMP2 is in an on state, and the first sampling transistor SMP1 is in an off state, the image voltage SIG stored in the second capacitor C2 may be output as the pixel signal PXS.

Figure 5:
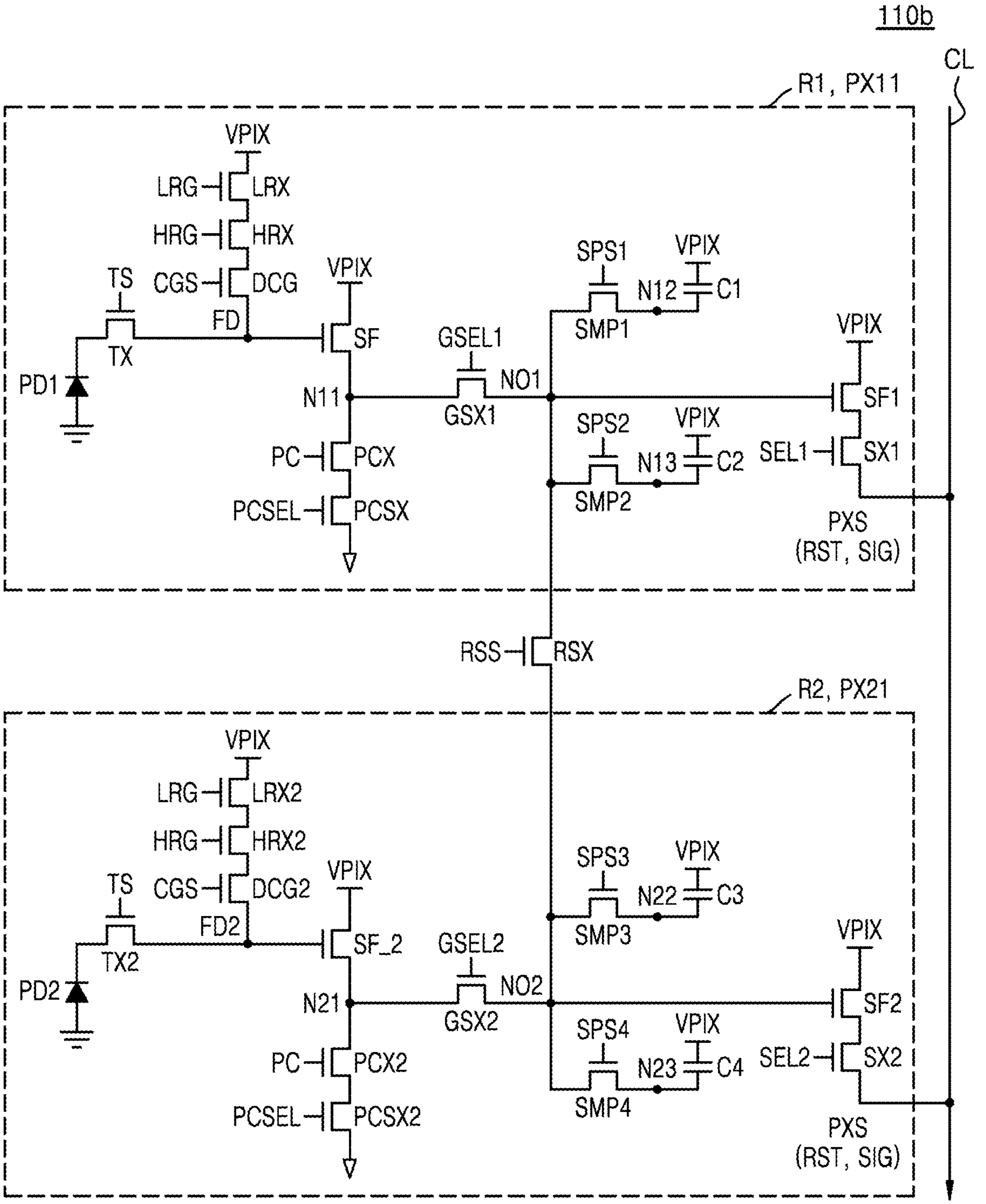
FIG. 5 is a circuit diagram illustrating a portion of an image pixel according to some example embodiments.

FIG. 5 is a circuit diagram illustrating a portion of a pixel array 110*b* according to some example embodiments. Hereinafter, descriptions already given with reference to FIGS. 3 and 4 are omitted.

Referring to FIG. 5, the pixel array 110*b* may include a first pixel PX11 located in a first row R1 and a second pixel PX21 located in a second row R2. The structures of the first pixel PX11 and the second pixel PX21 may correspond to the pixel PXa shown in FIGS. 3 and 4.

The operations of other components of the first pixel PX11, for example, a first photodiode PD1, a first reset transistor LRX1, a second reset transistor HRX1, a conversion gain transistor DCG1, the first source follower SF1, a precharge transistor PCX1, a precharge selection transistor PCSX1, the first global selection transistor GSX1, the first sampling transistor SMP1, and the second sampling transistor SMP2, are the same as the operation of the pixel PXa shown in FIGS. 3 and 4, and thus, redundant descriptions thereof are not omitted. In addition, a first node N11, a second node N12 and a third node N13 of the first pixel PX11 may respectively correspond to the first node N1, the second node N2 and the third node N3 in FIGS. 3 and 4.

Referring to FIG. 5, the second pixel PX21 may include a second photodiode PD2, a second reset transistor LRX2, a second reset transistor HRX2, a conversion gain transistor DCG2, a second source follower SF2, a precharge transistor PCX2, a precharge selection transistor PCSX2, a second global selection transistor GSX2, a third sampling transistor SMP3, and a fourth sampling transistor SMP4.

The configurations and operating methods of the second photodiode PD2, the second reset transistor LRX2, the second reset transistor HRX2, the conversion gain transistor DCG2, the second source follower SF2, the precharge transistor PCX2 and the precharge selection transistor PCSX2 of the second pixel PX21, shown in FIG. 5, are the same as the configuration and operating method of the pixel PXa shown in FIGS. 3 and 4, and thus, redundant descriptions thereof are omitted.

A first terminal of the second global selection transistor GSX2 may be connected to a first node N21, and a second terminal of the second global selection transistor GSX2 may be connected to a second output node NO2. The second output node NO2 may operate as a sensing node.

When a pixel operates in the global shutter mode, the third sampling transistor SMP3, the fourth sampling transistor SMP4, a third capacitor C3, and a fourth capacitor C4 may operate as sampling circuits for sampling a first voltage (for example, a reset voltage) and a second voltage (for example, an image voltage), which are output via the first node N21.

A first terminal of the third sampling transistor SMP3 may be connected to the second output node NO2, and a second terminal of the third sampling transistor SMP3 may be connected to a second node N22. A first terminal of the third capacitor C3 may be connected to the second node N22, and the pixel voltage VPIX may be applied to a second terminal of the third capacitor C3. In an embodiment, a ground voltage may be applied to the second terminal of the third capacitor C3. The third sampling transistor SMP3 may be turned on or turned off in response to a third sampling control signal SPS3, and may be turned on to connect the third capacitor C3 with the second output node NO2.

A first terminal of the fourth sampling transistor SMP4 may be connected to the second output node NO2, and a second terminal of the fourth sampling transistor SMP4 may be connected to a third node N23. A first terminal of the fourth capacitor C4 may be connected to the third node N23, and the pixel voltage VPIX may be applied to a second terminal of the fourth capacitor C4. In an embodiment, a ground voltage may be applied to the second terminal of the fourth capacitor C4. The fourth sampling transistor SMP4 may be turned on or turned off in response to a fourth sampling control signal SPS4, and may be turned on to connect the fourth capacitor C4 with the second output node NO2.

A reset voltage according to a reset operation or an image voltage according to photocharges accumulated in the photodiode PD may be sampled from each of the third capacitor C3 and the fourth capacitor C4.

During the global signal dumping period GSDP (in FIG. 2) and during a period in which the third sampling transistor SMP3 is in a turn-on state, charges may be accumulated in the third capacitor C3, and the reset voltage RST may be sampled from (or stored in) the third capacitor C3. Afterwards, during a period in which the fourth sampling transistor SMP4 is in a turn-on state, charges may be accumulated in the fourth capacitor C4, and the image voltage SIG may be sampled from (or stored in) the fourth capacitor C4.

The pixel voltage VPIX may be applied to a first terminal of the second source follower SF2, and a second terminal of the second source follower SF2 may be connected to a second selection transistor SX2. The second source follower SF2 may amplify a potential variation at the second output node NO2 and output a result of the amplification.

A first terminal of the second selection transistor SX2 may be connected to the second source follower SF2, and a second terminal of the second selection transistor SX2 may be connected to a column line CL. The second selection transistor SX2 may be turned on or turned off in response to a second selection control signal SEL2.

When FIGS. 3 and 4 are compared with each other, the pixel array 110*b* in FIG. 5 may include a shared transistor RSX between the first pixel PX11 and the second pixel PX21. For example, the shared transistor RSX may be further included between the first row R1 and the second row R2. For example, the shared transistor RSX may be included between the first pixel PX11 in the first row R1 and the second pixel PX21 in the second row R2.

A first terminal of the shared transistor RSX is connected to the first output node NO1, and a second terminal of the shared transistor RSX is connected to the second output node NO2. The shared transistor RSX may be turned on or turned off in response to a shared control signal RSS output from the row driver 120 (in FIG. 1). For example, when the shared transistor RSX is in a turn-on state, the first output node NO1 in the first row R1 and the second output node NO2 in the second row R2 may be electrically connected. When the shared transistor RSX is in a turn-off state, the shared transistor RSX may electrically isolate the first output node NO1 in the first row R1 from the second output node NO2 in the second row R2. The shared transistor RSX may be turned off during the global signal dumping period GSDP in FIG. 2 and may be turned on during the readout period in FIG. 2. A detailed operating method of the shared transistor RSX, according to some example embodiments, is described with reference to FIGS. 6 and 7.

In some example embodiments, each of the first capacitor C1, the second capacitor C2, the third capacitor C3, and the fourth capacitor C4 may store, for each frame, reset charges and signal charges according to a voltage of the floating diffusion node FD in which photocharges generated from the photodiode PD are accumulated, without overlapping. For example, signal charges may be stored in the first capacitor C1 and the fourth capacitor C4, and reset charges may be stored in the second capacitor C2 and the third capacitor C3.

In some example embodiments, the types of charges stored in each of the first capacitor C1, the second capacitor C2, the third capacitor C3, and the fourth capacitor C4 may be changed. The types of charges may include reset charges and signal charges. In at least one of frames, the types of charges stored in each of the first capacitor C1, the second capacitor C2, the third capacitor C3, and the fourth capacitor C4 may be changed. For example, in a first frame, signal charges may be stored in the first capacitor C1 and the fourth capacitor C4, and reset charges may be stored in the second capacitor C2 and the third capacitor C3. In a second frame consecutive to the first frame, reset charges may be stored in the first capacitor C1 and the fourth capacitor C4, and signal charges may be stored in the second capacitor C2 and the third capacitor C3. However, charges stored in each capacitor, according to some example embodiments, are not necessarily limited thereto.

When the pixel array 110*b* operates in the global shutter mode, the second selection transistor SX2 may be turned on during a readout period of the second pixel PX21 such that the second source follower SF2 may output, for example, the reset voltage RST or the image voltage SIG, as the pixel signal PXS, to the column line CL.

For example, when the second selection transistor SX2 is in an on state, the third sampling transistor SMP3 is in an on state, and the fourth sampling transistor SMP4 is in an off state, the reset voltage RST sampled from the third capacitor C3 may be output as the pixel signal PXS, and when the second selection transistor SX2 is in an on state, the fourth sampling transistor SMP4 is in an on state, and the third sampling transistor SMP3 is in an off state, the image voltage SIG stored in the fourth capacitor C4 may be output as the pixel signal PXS.

FIG. 5 illustrates the first pixel PX11 in the first row R1 and the second pixel PX21 in the second row R2, but the number of rows and the number of pixels are not limited thereto. Although not shown in FIG. 5, in some example embodiments, when the number of rows are n, the number of shared transistors RSX may be n−1. For example, when the number of rows are 3, the number of shared transistors RSX may be 2. In other words, the number of shared transistors RSX may vary according to the number of rows of a pixel array.

Figure 6:
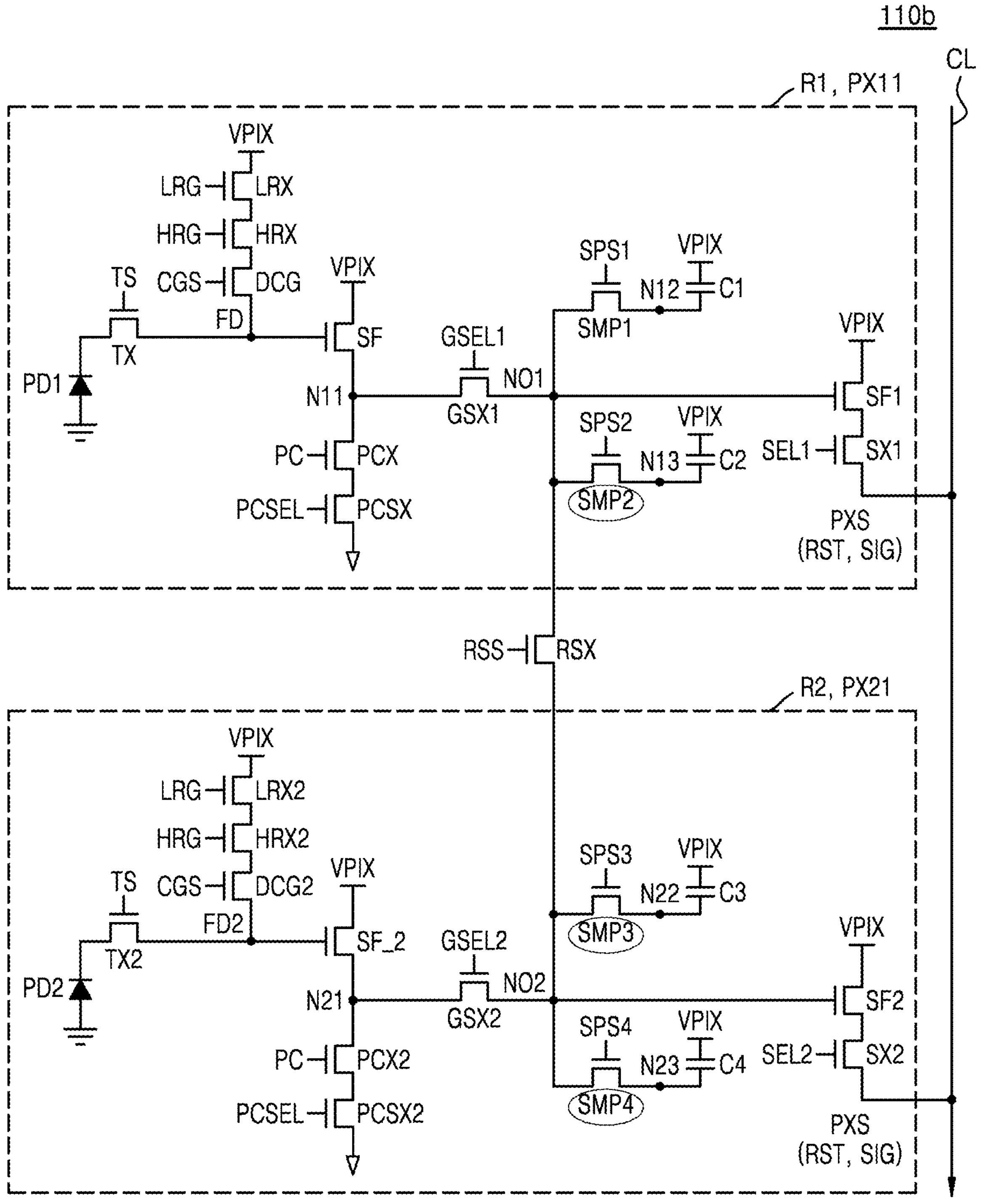
FIG. 6 is a circuit diagram illustrating an operation of a pixel during a first period in FIG. 2, according to some example embodiments.
Figure 7:
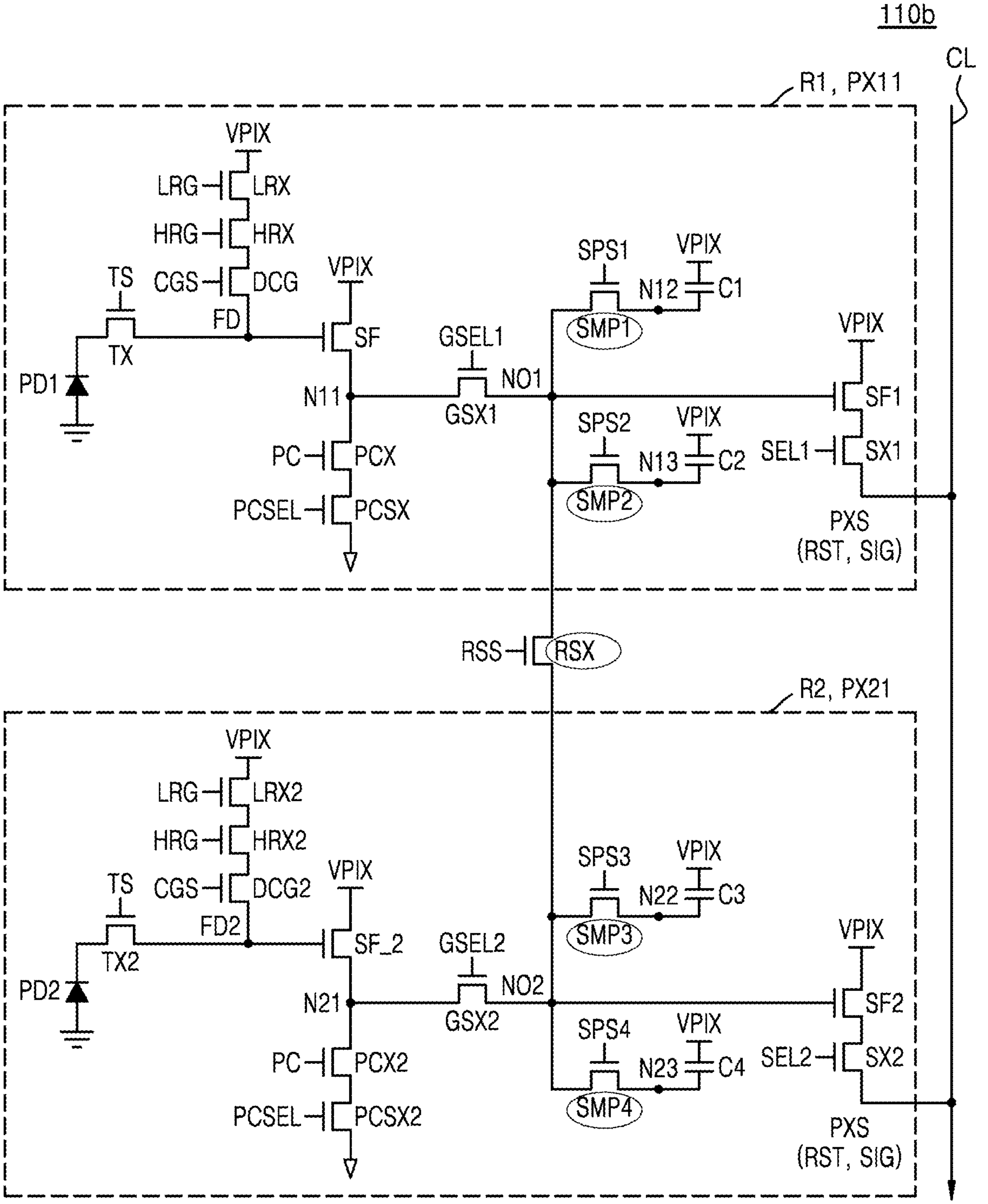
FIG. 7 is a circuit diagram illustrating an operation of a pixel during a second period in FIG. 2, according to some example embodiments.

FIG. 6 is a circuit diagram illustrating an operation of a pixel during the first period P1 in FIG. 2, according to some example embodiments. FIG. 7 is a circuit diagram illustrating an operation of a pixel during the second period P2 in FIG. 2, according to some example embodiments. Hereinafter, FIG. 5 is also referred to. In addition, descriptions already given with reference to FIG. 5 are omitted.

FIG. 6 illustrates an operation during the global signal dumping period when the pixel array 110*b* operates in the global shutter mode.

Referring to FIG. 6, the shared transistor RSX and the first sampling transistor SMP1 may be turned off, and the third sampling transistor SMP3 may be turned on. For example, during a period in which the shared transistor RSX is in a turn-off state, and the third sampling transistor SMP3 is in a turn-on state, charges may be accumulated in the third capacitor C3, and thus, the reset voltage RST and/or the image voltage SIG may be sampled from (or stored in) the third capacitor C3.

In contrast, in some example embodiments, the shared transistor RSX and the third sampling transistor SMP3 may be turned off, and the first sampling transistor SMP1 may be turned on. For example, during a period in which the shared transistor RSX is in a turn-off state, and the first sampling transistor SMP1 is in a turn-on state, charges may be accumulated in the first capacitor C1, and thus, the reset voltage RST and/or the image voltage SIG may be sampled from (or stored in) the first capacitor C1.

During the global signal dumping period, the first sampling transistor SMP1 and the third sampling transistor SMP3 may be simultaneously turned on/off, whereas the first sampling transistor SMP1 and the third sampling transistor SMP3 may be separately turned on/off. For example, when the first sampling transistor SMP1 is turned on, the third sampling transistor SMP3 may be turned off, and when the first sampling transistor SMP1 is turned off, the third sampling transistor SMP3 may be turned on.

In some example embodiments, during the global signal dumping period in which the shared transistor RSX is in a turn-off state, the second sampling transistor SMP2 may be turned on, and the fourth sampling transistor SMP4 may be turned on. Reset charges and/or signal charges may be accumulated in the second capacitor C2 and the fourth capacitor C4.

For example, charges accumulated in the second capacitor C2 may be reset charges, charges accumulated in the third capacitor C3 may be reset charges, and charges accumulated in the fourth capacitor C4 may be signal charges. However, charges stored in each capacitor according to some example embodiments are not necessarily limited thereto. For example, in some example embodiments, charges accumulated in the second capacitor C2 may be signal charges, charges accumulated in the third capacitor C3 may be signal charges, and charges accumulated in the fourth capacitor C4 may be reset charges.

In some example embodiments, the order in which at least one of the second sampling transistor SMP2, the third sampling transistor SMP3, and the fourth sampling transistor SMP4 is turned on may be changed. Because the order in which the second sampling transistor SMP2, the third sampling transistor SMP3, and the fourth sampling transistor SMP4 are turned on is changed, the types of charges stored in each of the second capacitor C2, the third capacitor C3, and the third capacitor C3 may be changed.

FIG. 7 illustrates an operation during the readout period when the pixel array 110*b* in FIG. 5 operates in the global shutter mode according to some example embodiments.

Referring to FIG. 7, the shared transistor RSX, the first sampling transistor SMP1, and the third sampling transistor SMP3 may be turned on. When the shared transistor RSX is in a turn-on state, the first output node NO1 and the second output node NO2 may be connected to each other such that the first capacitor C1 of the first output node NO1 and the fourth capacitor C4 of the second output node NO2 may be electrically connected to each other.

During the readout period, when the first selection transistor SX1 is turned on, and the first sampling transistor SMP1 is turned on, a signal corresponding to charges stored in the first capacitor C1 may be output to the column line CL. For example, the reset voltage RST and/or the image voltage SIG stored in the first capacitor C1 may be output, as the pixel signal PXS, to the column line CL via the first selection transistor SX1. When the first selection transistor SX1 is turned on, and the second sampling transistor SMP2 is turned on, a signal corresponding to charges stored in the second capacitor C2 may be output to the column line CL. For example, the reset voltage RST and/or the image voltage SIG stored in the second capacitor C2 may be output, as the pixel signal PXS, to the column line CL via the first selection transistor SX1.

During the readout period, when the second selection transistor SX2 is turned on, and the third sampling transistor SMP3 is turned on, a signal corresponding to charges stored in the third capacitor C3 may be output to the column line CL. For example, the reset voltage RST and/or the image voltage SIG stored in the third capacitor C3 may be output, as the pixel signal PXS, to the column line CL via the second selection transistor SX2. When the second selection transistor SX2 is turned on, and the fourth sampling transistor SMP4 is turned on, a signal corresponding to charges stored in the fourth capacitor C4 may be output to the column line CL. For example, the reset voltage RST and/or the image voltage SIG stored in the fourth capacitor C4 may be output, as the pixel signal PXS, to the column line CL via the second selection transistor SX2.

Therefore, in some example embodiments, when the shared transistor RSX is in a turn-on state, the equivalent capacitances of the first output node NO1 and the second output node NO2 may increase, and a greater amount of photocharges generated from the photodiode PD may be accumulated in the first capacitor C1 and the fourth capacitor C4. In other words, the full well capacity (FWC) of a pixel may increase.

In some example embodiments, like the global signal dumping period, when the shared transistor RSX is turned off, and the third sampling transistor SMP3 is turned on, the FWC of the pixel may be a third capacitance value, but like the readout period, when the shared transistor RSX is turned on, and the first sampling transistor SMP1 and the third sampling transistor SMP3 are also turned on, the FWC of the pixel may be a value that is the sum of the capacitance of the shared transistor RSX, the capacitance of the first capacitor C1, and the capacitance of the third capacitor C3. Because the FWC has increased, it may also be possible to increase the time for charge accumulation.

Therefore, according to some example embodiments, by turning on/off the shared transistor RSX, an image sensor according to some example embodiments may achieve a high dynamic range (HDR) without increasing the area of a pixel and may obtain a high conversion gain. In other words, a wide dynamic range (WDR) may be achieved.

Figure 8:
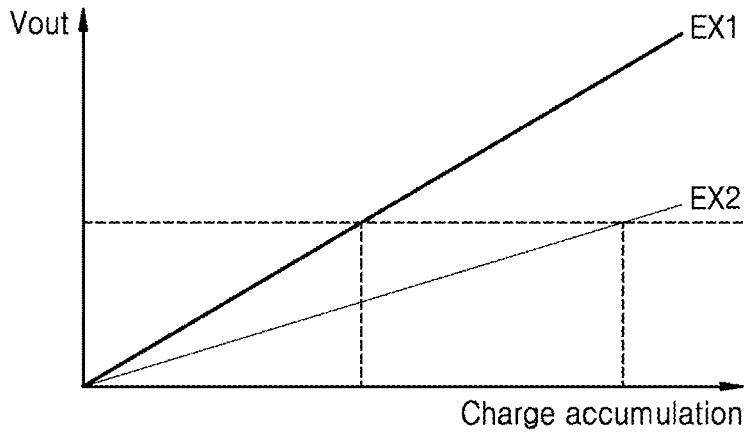
FIG. 8 is a graph related to charge accumulation according to a voltage output to a column line, according to some example embodiments.

FIG. 8 is a graph related to charge accumulation according to a voltage output to a column line, according to some example embodiments.

Referring to FIG. 8, the vertical axis may represent a voltage (Vout), for example, a reset voltage and/or an image voltage, output to the column line, and the horizontal axis may represent the amount of charge accumulated in a capacitor of a pixel.

Referring to FIGS. 5 and 8 together, the pixel array 110*b* may include the shared transistor RSX and may electrically connect or isolate the first output node NO1 in the first row R1 to or from the second output node NO2 in the second row R2. For example, when the shared transistor RSX is in a turn-on state, the first output node NO1 in the $n^{th}$ row Rn and the second output node NO2 in an $(n+1)^{th}$ row Rn+1 may be electrically connected to each other.

According to a comparative example EX1, because the shared transistor RSX, which electrically connects the first output node NO1 in the first row R1 to the second output node NO2 in the second row R2, is not included, the equivalent capacitances of the first output node NO1 and the second output node NO2 may be the same as the capacitance of the third capacitor C3. In some example embodiments, the FWC of the pixel array 110*b* may be a value that is the sum of the capacitance of the second capacitor C2, the capacitance of the third capacitor C3, and the capacitance of the fourth capacitor C4.

However, according to an example EX2 of some example embodiments, because the pixel array 110*b* may include the shared transistor RSX that electrically connects the first output node NO1 in the first row R1 to the second output node NO2 in the second row R2, the first output node NO1 and the second output node NO2 may be electrically connected by turning on the shared transistor RSX. Because the first output node NO1 and the second output node NO2 are connected to each other, the equivalent capacitances of the first output node NO1 and the second output node NO2 may increase, and a greater amount of photocharges generated from the photodiode PD may be accumulated in the first capacitor C1 and the fourth capacitor C4. In other words, the FWC of the pixel may increase. The FWC of the pixel array 110*b* may be a value that is the sum of the capacitance of the shared transistor RSX, the capacitance of the first capacitor C1, and the capacitance of the third capacitor C3. In some example embodiments, the FWC of the pixel array 110*b* may be a value that is the sum of the capacitance of the shared transistor RSX, the capacitance of the first capacitor C1, the capacitance of the second capacitor C2, the capacitance of the third capacitor C3, and the capacitance of the fourth capacitor C4.

Therefore, when compared at the same voltage level, the example EX2 according to some example embodiments may have a greater amount of charge accumulated in the pixel array than the comparative example EX1. In other words, the example EX2 according to some example embodiments may have a greater FWC than the comparative example EX1.

Figure 9:
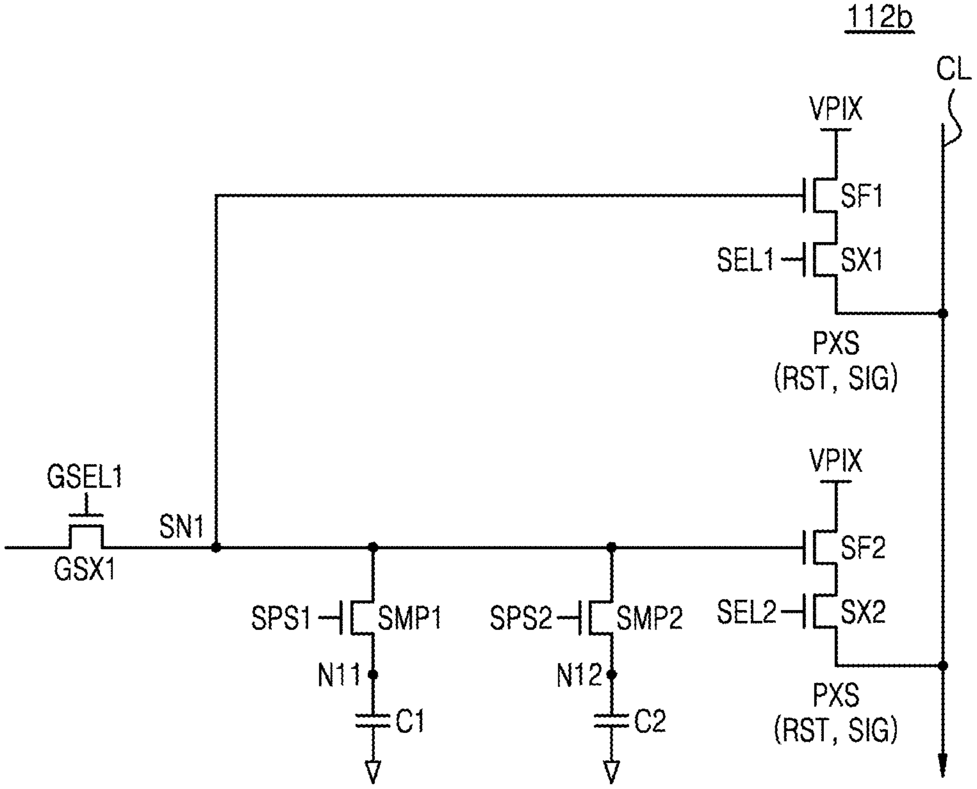
FIG. 9 is a circuit diagram illustrating a pixel generating circuit according to some example embodiments.

FIG. 9 is a circuit diagram illustrating a pixel generating circuit 112*b* according to some example embodiments. Hereinafter, descriptions already given with reference to FIGS. 3 to 5 are omitted.

Referring to FIG. 9, the pixel generating circuit 112*b* may correspond to the pixel signal generating circuit 112 shown in FIGS. 3 and 4.

The pixel generating circuit 112*b* may include the first global selection transistor GSX1, the first source follower SF1, the first selection transistor SX1, the first sampling transistor SMP1, the second sampling transistor SMP2, the second source follower SF2, and the second selection transistor SX2.

The first terminal of the first global selection transistor GSX1 may be connected to the first node N1 (in FIG. 3), and the second terminal of the first global selection transistor GSX1 may be connected to a first output node SN1. For example, the first output node SN1 may operate as a sensing node. The first global selection transistor GSX1 may be turned on or turned off in response to the first global selection signal GSEL1 output from the row driver 120 (in FIG. 1).

The pixel voltage VPIX may be applied to the first terminal of the first source follower SF1, and the second terminal of the first source follower SF1 may be connected to the first selection transistor SX1. The first source follower SF1 may amplify a potential variation at the first output node SN1 and output a result of the amplification.

The first terminal of the first selection transistor SX1 may be connected to the first selection transistor SX1, and the second terminal of the first selection transistor SX1 may be connected to a column line CL. The first selection transistor SX1 may be turned on or turned off in response to the first selection control signal SEL1.

The first terminal of the first sampling transistor SMP1 may be connected to the first output node SN1, and the second terminal of the first sampling transistor SMP1 may be connected to the first node N11. The first terminal of the first capacitor C1 may be connected to the first node N11, and a ground voltage may be applied to the second terminal of the first capacitor C1. The first sampling transistor SMP1 may be turned on or turned off in response to the first sampling control signal SPS1, and may be turned on to connect the first capacitor C1 with the first output node SN1.

The first terminal of the second sampling transistor SMP2 may be connected to the first output node SN1, and the second terminal of the second sampling transistor SMP2 may be connected to the second node N12. The first terminal of the second capacitor C2 may be connected to the second node N12, and a ground voltage may be applied to the second terminal of the second capacitor C2. The second sampling transistor SMP2 may be turned on or turned off in response to the second sampling control signal SPS2, and may be turned on to connect the second capacitor C2 with the first output node SN1.

A reset voltage according to a reset operation or an image voltage according to the photocharges accumulated in the photodiode PD may be sampled from each of the first capacitor C1 and the second capacitor C2.

Figure 10:
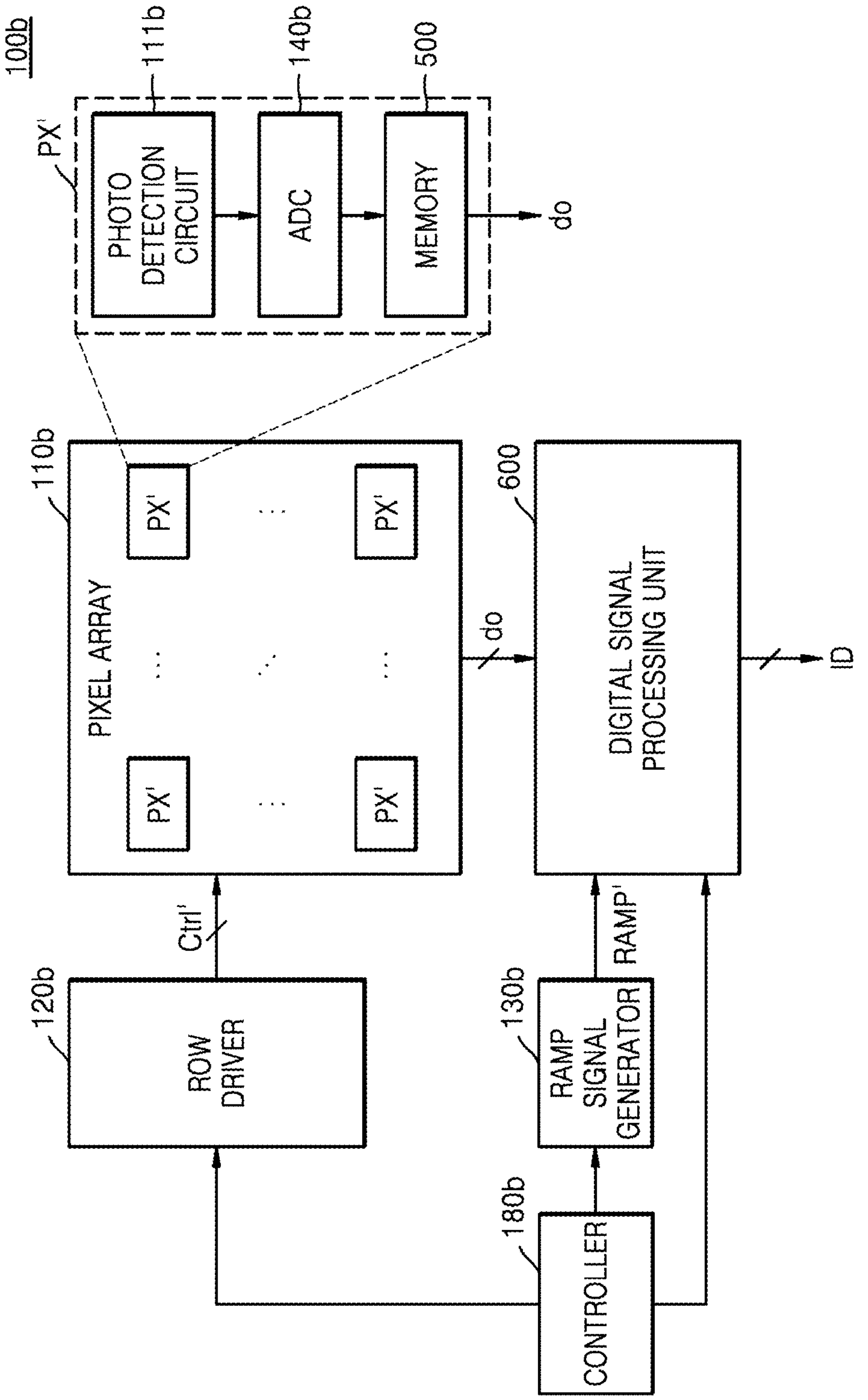
FIG. 10 is a block diagram illustrating an image sensor according to some example embodiments.

FIG. 10 is a block diagram illustrating an image sensor 100*b* according to some example embodiments. Redundant descriptions already given with reference to FIG. 1 are omitted.

A pixel PX' shown in FIG. 10 may be a digital pixel.

Referring to FIG. 10, the pixel PX' may include a photo detection circuit 111*b*, an analog-to-digital converter (ADC) 140*b*, and a memory 500. The photo detection circuit 111*b* may include a photo-sensing device and may convert an externally detected optical signal into an electrical signal, for example, a pixel signal that is an analog signal. For example, the photo-sensing device may include a photodiode, a phototransistor, a photogate, or a pinned photodiode.

The photo detection circuit 111*b* may include a plurality of capacitors that store charges according to a voltage of a floating diffusion node. In one frame, the types of charges stored in each of the plurality of capacitors may not overlap. For example, a first capacitor may store one of reset charges and signal charges, and a second capacitor may store the other one of the reset charges and the signal charges, which are not stored in the first capacitor.

In some example embodiments, the types of charges stored in each of the plurality of capacitors included in the photo detection circuit 111*b* may be changed. For example, the type of charges stored in the first capacitor and the type of charges stored in the second capacitor may not remain the same.

The ADC 140*b* may convert a pixel signal output from the photo detection circuit 111*b* into a digital signal, and the memory 500 may store the converted digital signal. The memory 500 may output a pixel value do under control by the row driver 120. The ADC 140*b* may convert a pixel signal into the pixel value do that is a digital signal, by comparing the pixel signal with a ramp signal RAMP'. The ADC 140*b* may perform an identical or similar operation to the ADC circuit 140 in FIG. 1.

A controller 180*b* may control the overall operation of the image sensor 100*b*. The controller 180*b* may perform an identical or similar operation to the timing controller 180 in FIG. 1.

A row driver 120*b* may generate control signals Ctrl' for controlling the pixel array 110*b* and provide the control signals Ctrl' to each of a plurality of pixels PX'.

A ramp signal generator 130*b* may generate the ramp signal RAMP'. The ramp signal RAMP' is a signal for converting an analog signal into a digital signal and may be generated to have a triangle wave form. The ramp signal generator 130*b* may transmit or send the ramp signal RAMP' to the pixel array 110*b*.

A digital signal processing unit 600 may perform digital signal processing on pixel values "do" received from the pixel array 110*b* and provide final image data ID to an external apparatus. The digital signal processing unit 600 may determine a final digital value corresponding to an optical signal detected from one pixel PX', by performing calculation on the pixel value "do". The final image data ID may be generated by combining final digital values determined from each of the plurality of pixels PX'.

Figure 11:
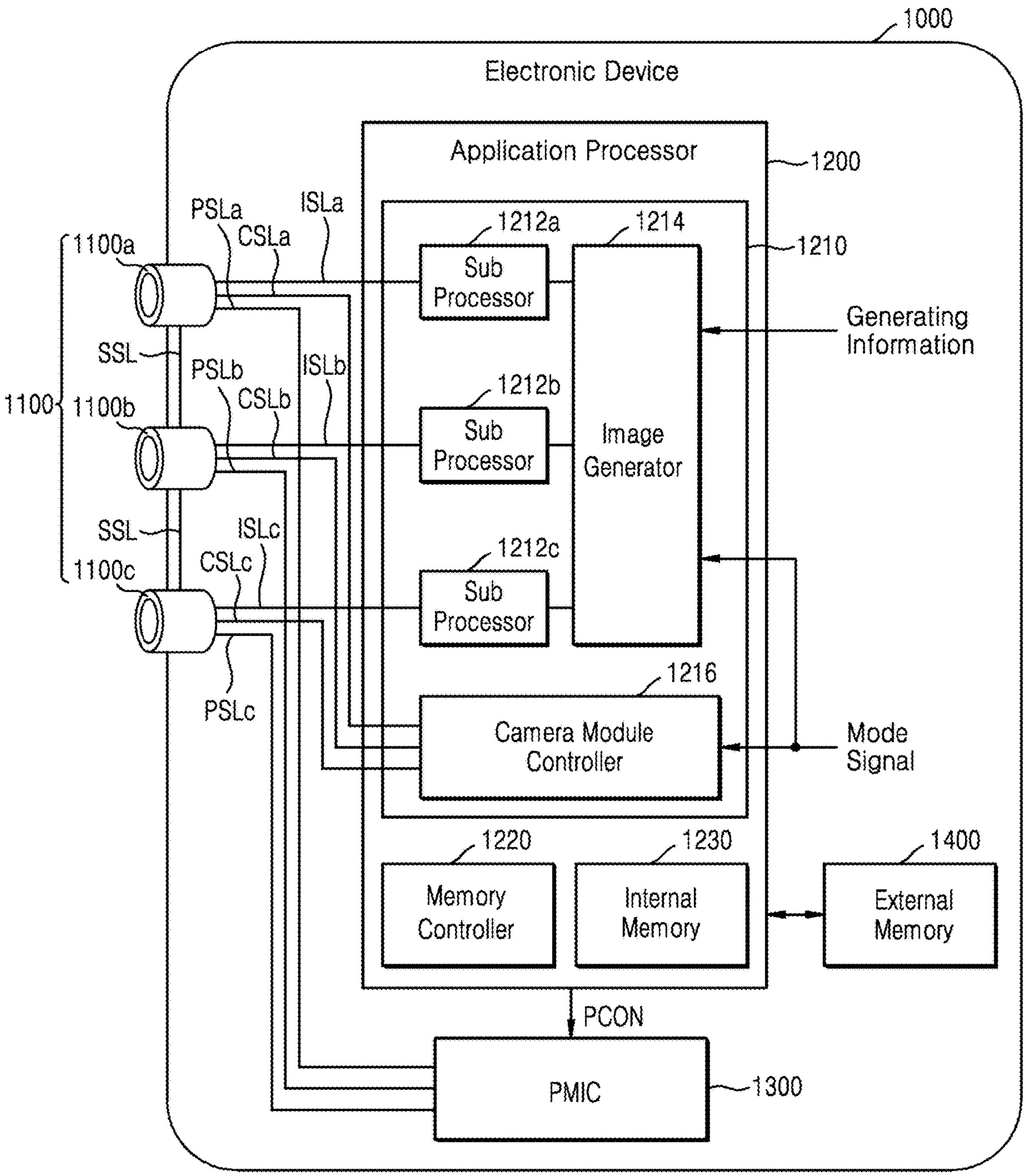
FIG. 11 is a block diagram of an electronic device including a multi-camera module, according to some example embodiments.
Figure 12:
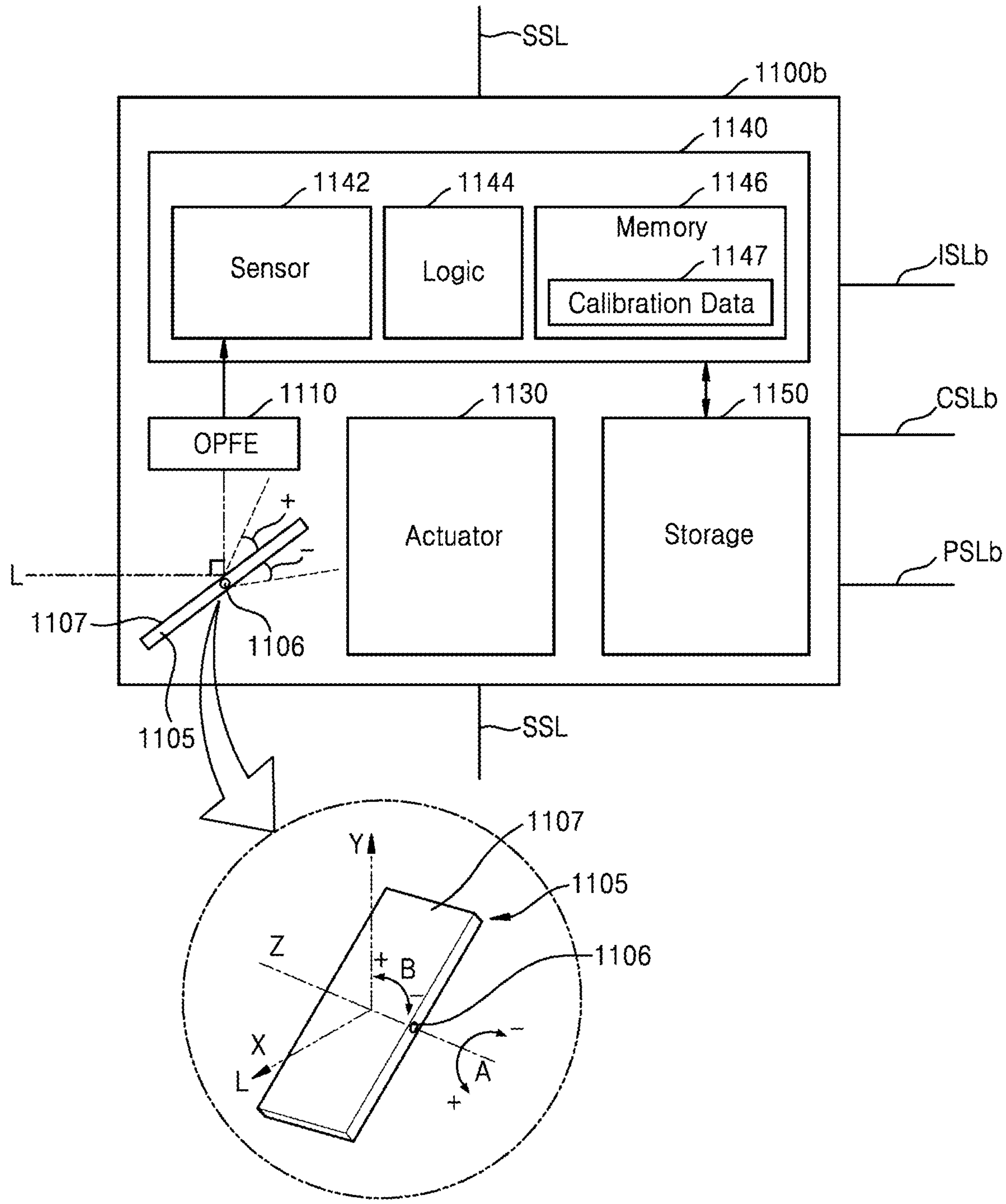
FIG. 12 is a detailed block diagram of the camera module in FIG. 11, according some example embodiments.

FIG. 11 is a block diagram of an electronic device 1000 including a multi-camera module according to some example embodiments. FIG. 12 is a detailed block diagram of a camera module 1100*b* in FIG. 11 according to some example embodiments. FIG. 12 illustrates a detailed configuration of the camera module 1100*b*, but the following description may be equally applied to other camera modules 1100*a* and 1100*c* according to some example embodiments.

Referring to FIG. 11, the electronic device 1000 may include a camera module group 1100, an application processor 1200, a power management integrated circuit (PMIC) 1300, and an external memory 1400. The camera module group 1100 may include the camera modules 1100*a*, 1100*b*, and 1100*c*. Although FIG. 11 illustrates an example embodiment in which three camera modules 1100*a*, 1100*b*, and 1100*c* are arranged, example embodiments are not limited thereto.

Referring to FIGS. 11 and 12, the camera module 1100*b* may include a prism 1105, an optical path folding element (OPFE) 1110, an actuator 1130, an image sensing device 1140, and a storage 1150.

The prism 1105 may change a path of light L incident from the outside by including a reflective surface 1107 of a light reflective material. The OPFE 1110 may include, for example, an optical lens including m groups (wherein m is a natural number). The actuator 1130 may move the OPFE 1110 or an optical lens to a certain position.

The image sensing device 1140 may include an image sensor 1142, a control logic 1144, and a memory 1146. The image sensor 1142 may sense an image of an object to be sensed by using the light L provided through the optical lens. The image sensor 1142 may be the image sensor 100 described with reference to FIG. 1 and may be the image sensor 100*b* described with reference to FIG. 10.

The control logic 1144 may control the overall operation of the camera module 1100*b*. For example, the control logic 1144 may control the operation of the camera module 1100*b* according to a control signal provided via a control signal line CSLb.

In some example embodiments, one camera module (for example, 1100*b*) among the camera modules 1100*a*, 1100*b*, and 1100*c* may be a folded lens-type camera module including the prism 1105 and the OPFE 1110 described above, and the remaining camera modules (for example, 1100*a* and 1100*b*) may be vertical-type camera modules that do not include the prism 1105 and the OPFE 1110, but example embodiments are not limited thereto.

In some example embodiments, one camera module (for example, 1100*c*) among the camera modules 1100*a*, 1100*b*, and 1100*c* may be a vertical-type depth camera that extracts depth information by using, for example, infrared ray (IR). For example, the application processor 1200 may generate a three-dimensional (3D) depth image by merging an image data value provided by the depth camera with an image data value provided by another camera module (for example, 1100*a* or 1100*b*).

In some example embodiments, at least two camera modules (for example, 1100*a* and 1100*b*) among the camera modules 1100*a*, 1100*b*, and 1100*c* may have different field of views. For example, optical lenses of at least two camera modules (for example, 1100*a* and 1100*b*) among the camera modules 1100*a*, 1100*b*, and 1100*c* may be different from each other, but the present inventive concepts are not limited thereto.

In some example embodiments, the field of views of the camera modules 1100*a*, 1100*b*, and 1100*c* may be different from each other. For example, optical lenses included in the cameras modules 1100*a*, 1100*b*, and 1100*c* may be different from each other, but the inventive concept is not limited thereto.

In some example, the camera modules 1100*a*, 1100*b*, and 1100*c* may be physically apart from each other. In other words, a sensing region of one image sensor 1142 is not divided and used by the camera modules 1100*a*, 1100*b*, and 1100*c*, but the image sensor 1142 may be independently arranged in each of the cameras modules 1100*a*, 1100*b*, and 1100*c*.

Referring back to FIG. 11, the application processor 1200 may include an image processing device 1210, a memory controller 1220, and an internal memory 1230. The application processor 1200 may be implemented separately from the camera modules 1100*a*, 1100*b*, and 1100*c*. For example, the application processor 1200 and the camera modules 1100*a*, 1100*b*, and 1100*c* may be implemented separately from each other as separate semiconductor chips.

The image processing device 1210 may include a plurality of sub processors 1212*a*, 1212*b*, and 1212*c*, an image generator 1214, and a camera module controller 1216.

The image processing device 1210 may include the plurality of sub processors 1212*a*, 1212*b*, and 1212*c*, the total number of which corresponds to the number of the cameras modules 1100*a*, 1100*b*, and 1100*c*.

Image data values generated by each of the camera modules 1100*a*, 1100*b*, and 1100*c* may be provided to the corresponding sub processors 1212*a*, 1212*b*, and 1212*c* via separate image signal lines ISLa, ISLb, and ISLc. For example, the image data value generated by the camera module 1100*a* may be provided to the sub processor 1212*a* via the image signal line ISLa, the image data value generated by the camera module 1100*b* may be provided to the sub processor 1212*b* via the image signal line ISLb, and the image data value generated by the camera module 1100*c* may be provided to the sub processor 1212*c* via the image signal line ISLc. The transmission of the image data value may be performed by using, for example, a camera serial interface (CSI) based on a mobile industry processor interface (MIPI), but embodiments are not limited thereto.

The image data value provided to each of the sub processors 1212*a*, 1212*b*, and 1212*c* may be provided to the image generator 1214. The image generator 1214 may generate an output image by using image data provided from each of the sub processors 1212*a*, 1212*b*, and 1212*c*, according to image generating information or a mode signal.

Specifically, according to some example embodiments, the image generator 1214 may generate an output image by merging at least some of the image data values generated by the camera modules 1100*a*, 1100*b*, and 1100*c* having different field of views, according to image generating information or a mode signal. In some example embodiments, the image generator 1214 may generate an output image by selecting one of the image data values generated by the camera modules 1100*a*, 1100*b*, and 1100*c* having different field of views, according to image generating information or a mode signal.

The camera module controller 1216 may provide a control signal to each of the camera modules 1100*a*, 1100*b*, and 1100*c*. The control signal generated from the camera module controller 1216 may be provided to the corresponding camera modules 1100*a*, 1100*b*, and 1100*c* through control signal lines CSLa, CSLb, and CSLc, which are separated from one another.

The application processor 1200 may store received image data values, for example, encoded data, in the internal memory 1230 provided therein or the external memory 1400 outside the application processor 1200, and then, may decode the encoded data read from the internal memory 1230 or the external memory 1400, and may display an image generated based on the decoded image data values. For example, a corresponding sub processor among the plurality of sub processors 1212*a*, 1212*b*, and 1212*c* of the image processing device 1210 may perform decoding and may also perform image processing on the decoded image data values.

The PMIC 1300 may supply power, for example, a power voltage, to each of the camera modules 1100*a*, 1100*b*, and 1100*c*. For example, the PMIC 1300 may supply first power to the camera module 1100*a* through a power signal line PSLa, supply second power to the camera module 1100*b* through a power signal line PSLb, and supply third power to the camera module 1100*c* through a power signal line PSLc, under control by the application processor 1200.

Figure 13:
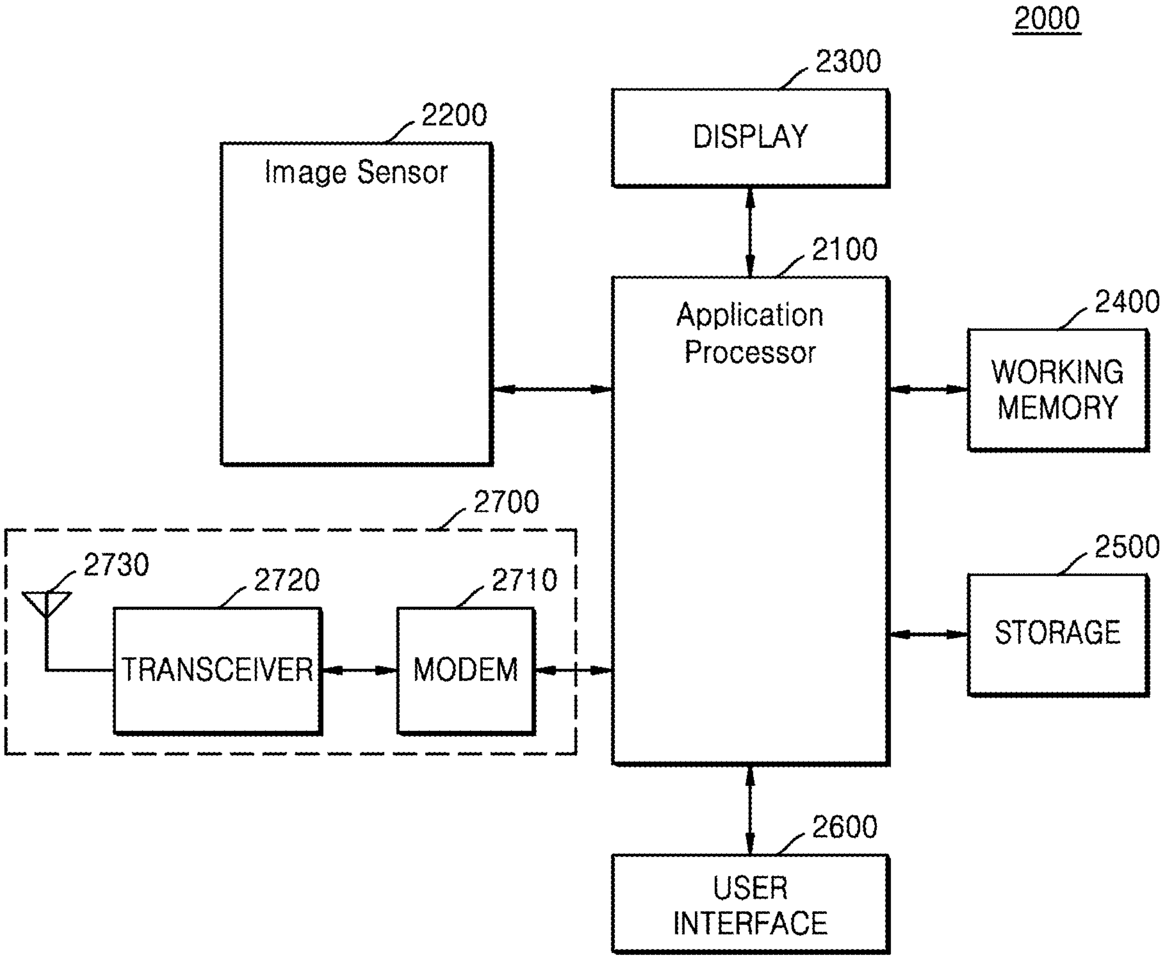
FIG. 13 is a block diagram illustrating an electronic device according to some example embodiments.

FIG. 13 is a block diagram illustrating an electronic device 2000 according to some example embodiments. For example, the electronic device 2000 may be a portable terminal.

Referring to FIG. 13, the electronic device 2000 according to some example embodiments may include an application processor 2100, an image sensor 2200, a display 2300, a working memory 2400, a storage 2500, a user interface 2600, and a wireless transceiver 2700. The descriptions of the image sensor according to some example embodiments described with reference to FIGS. 1 to 12 and the operating method of the image sensor may be applied to the image sensor 2200.

The application processor 2100 may be provided as a system-on-chip (SoC), which controls the overall operation of the electronic device 2000 and runs an application program, an operating system, etc. The application processor 2100 may receive output data from the image sensor 2200.

The image sensor 2200 may generate image data based on a received optical signal and may provide the image data to the application processor 2100. The image sensor 2200 may include a plurality of pixels each including a plurality of storage capacitors. The type of charges according to a voltage of a floating node stored in the plurality of storage capacitors may be changed. However, example embodiments are not limited thereto.

In some example embodiments, the image sensor 2200 may include a shared transistor that may electrically connect or isolate an output node in an $n^{th}$ row to or from an output node in an $(n+1)^{th}$ row. The output node in the $n^{th}$ row and the output node in the $(n+1)^{th}$ row may be electrically connected to or isolated from each other. For example, when the shared transistor is in a turn-on state, the equivalent capacitances of the output node in the $n^{th}$ row and the output node in the $(n+1)^{th}$ row may increase, and a greater amount of photocharges generated from a photodiode may be accumulated in each of the capacitors. The FWC of a pixel may increase.

In some example embodiments, by turning on/off the shared transistor, the image sensor 2200 according to some example embodiments may achieve an HDR without increasing the area of a pixel and may obtain a high conversion gain.

The working memory 2400 may be implemented as volatile memory, such as DRAM, SRAM, etc., or non-volatile resistive memory, such as FeRAM, RRAM, PRAM, etc. The working memory 2400 may store programs and/or data executed or processed by the application processor 2100.

The storage 2500 may be implemented as a non-volatile memory device, such as, NAND flash, resistive memory, etc., and the storage 2500 may be provided as, for example, memory cards (multi-media card (MMC), embedded MMC (eMMC), secure card (SD), and micro SD). The storage 2500 may store data and/or a program for an execution algorithm for controlling an image processing operation of the image sensor 2200, and the data and/or the program may be loaded into the working memory 2400 when the image processing operation is performed. In some example embodiments, the storage 2500 may store output image data, for example, correction image data or post-processed image data, generated by the image sensor 2200.

The user interface 2600 may be implemented as various devices capable of receiving a user input, such as a keyboard, a curtain key panel, a touch panel, a fingerprint sensor, a microphone, etc. The user interface 2600 may receive a user input and provide, to the application processor 2100, a signal corresponding to the received user input.

The wireless transceiver 2700 may include a transceiver 2720, a modem 2710, and an antenna 2730.

As described herein, any devices, electronic devices, modules, units, and/or portions thereof according to any of the example embodiments, and/or any portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

While the present inventive concepts have been particularly shown and described with reference to some example embodiments thereof, it will be understood that various changes in form and details may be made therein without departing from the spirit and scope of the following claims.

What is claimed is:

1. An image sensor, comprising:

a pixel array including a first pixel and a second pixel, the first pixel including:

a first photodiode;

a first floating diffusion node configured to accumulate photocharges generated from the first photodiode;

a first global selection transistor including a first end connected to a first node and a second end connected to a first output node;

a first capacitor configured to store signal charges corresponding to a voltage of the first floating diffusion node configured to accumulate the photocharges;

a first sampling transistor including a first end connected to the first output node and a second end connected to the first capacitor;

a second capacitor configured to store reset charges corresponding to a voltage of the first floating diffusion node that has been reset; and a second sampling transistor including a first end connected to the first output node and a second end connected to the second capacitor, the second pixel including:

a second photodiode;

a second floating diffusion node configured to accumulate photocharges generated from the second photodiode;

a second global selection transistor including a first end connected to a second node and a second end connected to a second output node;

a third capacitor configured to store reset charges corresponding to a voltage of the second floating diffusion node that has been reset;

a third sampling transistor including a first end connected to the second output node and a second end connected to the third capacitor;

a fourth capacitor configured to store signal charges corresponding to a voltage of the second floating diffusion node configured to accumulate the photocharges; and a fourth sampling transistor including a first end connected to the second output node and a second end connected to the fourth capacitor, and the pixel array comprises a shared transistor coupled between the first pixel and the second pixel, the shared transistor including a first end connected to the first output node of the first pixel and a second end connected to the second output node of the second pixel.

2. The image sensor of claim 1, wherein the first pixel further includes:

a transfer transistor configured to transfer the photocharges generated from the first photodiode to the first floating diffusion node;

a source follower configured to amplify the voltage of the first floating diffusion node and output the voltage to the first node;

a reset transistor configured to reset the first floating diffusion node to a pixel voltage; and a conversion gain transistor including a first end connected to the first floating diffusion node and a second end connected to one end of the reset transistor.

3. The image sensor of claim 1, wherein the first pixel further includes: a first source follower configured to amplify a voltage of the first output node and output the voltage; and a first selection transistor connected between an output terminal of the first source follower and a column line, and the second pixel further includes:

a second source follower configured to amplify a voltage of the second output node and output the voltage; and a second selection transistor connected between an output terminal of the second source follower and the column line.

4. The image sensor of claim 3, wherein, based on the pixel array being in a global shutter mode, in the first pixel and the second pixel, a reset voltage is sampled from the second capacitor and the third capacitor, and an image voltage is sampled from the fourth capacitor, during a first period and on a row-by-row basis.

5. The image sensor of claim 4, wherein, based on the pixel array being in the global shutter mode, in the first pixel and the second pixel, the image voltage sampled from the first capacitor and the fourth capacitor and the reset voltage sampled from the second capacitor and the third capacitor are output, as pixel signals, to the column line during a second period consecutive to the first period and on the row-by-row basis.

6. The image sensor of claim 3, wherein, based on an off state of the shared transistor, the signal charges are accumulated in the fourth capacitor, and the reset charges are sampled from the second capacitor and the third capacitor, and based on an on state of the shared transistor, an image voltage sampled from the first capacitor and the fourth capacitor and a reset voltage sampled from the second capacitor and the third capacitor are output, as pixel signals, to the column line.

7. The image sensor of claim 1, wherein, based on the pixel array being in a global shutter mode, the shared transistor is turned off during a first period, and the shared transistor is turned on during a second period consecutive to the first period.

8. The image sensor of claim 7, wherein, based on the pixel array being in the global shutter mode, during the first period, the shared transistor is turned off, and the third sampling transistor is turned on, and during the second period, the shared transistor is turned on, and the first sampling transistor and the third sampling transistor are turned on.

9. The image sensor of claim 1, wherein, based on an off state of the shared transistor, a full well capacity of the pixel array includes a sum of capacitances of the second to fourth capacitors, and based on an on state of the shared transistor, the full well capacity of the pixel array includes a sum of a capacitance of the shared transistor and capacitances of the first to fourth capacitors.

10. The image sensor of claim 1, wherein the image sensor further comprises a timing controller configured to:

calculate a number of uses of at least one of the first to fourth capacitors, and change types of charges stored in each of the first to fourth capacitors based on the number of uses of the first to fourth capacitors.

11. A pixel array, comprising:

a first pixel including:

a first photodiode, a first floating diffusion node configured to accumulate photocharges generated by the first photodiode, a first sampling transistor configured to store, in a first capacitor, charges corresponding to a voltage of the first floating diffusion node configured to accumulate the photocharges, the first sampling transistor including a first end connected to a first output node, and a second sampling transistor configured to store, in a second capacitor, charges corresponding to a voltage of the first floating diffusion node that has been reset, the second sampling transistor including a first end connected to the first output node;

a second pixel including:

a second photodiode, a second floating diffusion node configured to accumulate photocharges generated by the second photodiode, a third sampling transistor configured to store, in a third capacitor, charges corresponding to a voltage of the second floating diffusion node that has been reset, the third sampling transistor including a first end connected to a second output node, and a fourth sampling transistor configured to store, in a fourth capacitor, charges corresponding to a voltage of the second floating diffusion node configured to accumulate the photocharges, the fourth sampling transistor including a first end connected to the second output node; and a shared transistor coupled between the first pixel and the second pixel, the shared transistor including a first end connected to the first output node of the first pixel and a second end connected to the second output node of the second pixel.

12. The pixel array of claim 11, wherein, based on the first pixel and the second pixel being in a global shutter mode, the shared transistor is turned off during a first period, and the shared transistor is turned on during a second period consecutive to the first period.

13. The pixel array of claim 12, wherein, based on the first pixel and the second pixel being in the global shutter mode, during the first period, the shared transistor is turned off, and the third sampling transistor is turned on, and during the second period, the shared transistor is turned on, and the first sampling transistor and the third sampling transistor are turned on.

14. The pixel array of claim 12, wherein, based on an off state of the shared transistor, signal charges are accumulated in the fourth capacitor, and reset charges are accumulated in the second capacitor and the third capacitor, and based on an on state of the shared transistor, an image voltage sampled from the first capacitor and the fourth capacitor and a reset voltage sampled from the second capacitor and the third capacitor are output, as pixel signals, to a column line.

15. The pixel array of claim 11, wherein, based on an on state of the shared transistor, the first output node and the second output node are electrically connected to each other to output a pixel signal to a column line.

16. The pixel array of claim 15, wherein, based on an off state of the shared transistor, a full well capacity of the pixel array includes a sum of capacitances of the second to fourth capacitors, and based on the on state of the shared transistor, the full well capacity of the pixel array includes a sum of a capacitance of the shared transistor and capacitances of the first to fourth capacitors.

17. The pixel array of claim 11, wherein the first pixel further includes:

a transfer transistor configured to transfer the photocharges generated from the first photodiode to the first floating diffusion node;

a source follower configured to amplify the voltage of the first floating diffusion node and output the voltage to a first node;

a reset transistor configured to reset the first floating diffusion node to a pixel voltage;

a conversion gain transistor including a first end connected to the first floating diffusion node and a second end connected to one end of the reset transistor;

a first source follower configured to amplify and output a voltage of the first output node; and a first selection transistor connected between an output terminal of the first source follower and a column line.

18. An image sensor, comprising:

a pixel array including a first pixel and a second pixel, the first pixel in an $n^{th}$ row of the pixel array, n being a natural number, and the second pixel in an $(n+1)^{th}$ row of the pixel array, the first pixel including:

a first floating diffusion node configured to accumulate photocharges generated from a first photodiode;

a first global selection transistor including a first end connected to a first node and a second end connected to a first output node;

a first capacitor configured to store signal charges corresponding to a voltage of the first floating diffusion node configured to accumulate the photocharges;

a first sampling transistor including a first end connected to the first output node and a second end connected to the first capacitor;

a second capacitor configured to store reset charges corresponding to a voltage of the first floating diffusion node that has been reset; and a second sampling transistor including a first end connected to the first output node and a second end connected to the second capacitor, the second pixel including:

a second floating diffusion node configured to accumulate photocharges generated from a second photodiode;

a second global selection transistor including a first end connected to a second node and a second end connected to a second output node;

a third capacitor configured to store reset charges corresponding to a voltage of the second floating diffusion node that has been reset;

a third sampling transistor including a first end connected to the second output node and a second end connected to the third capacitor;

a fourth capacitor configured to store signal charges corresponding to a voltage of the second floating diffusion node configured to accumulate the photocharges; and a fourth sampling transistor including a first end connected to the second output node and a second end connected to the fourth capacitor, and the pixel array comprises a shared transistor coupled between the first pixel and the second pixel, the shared transistor including a first end connected to the first output node of the first pixel and a second end connected to the second output node of the second pixel.

19. The image sensor of claim 18, wherein, based on the first pixel and the second pixel being in a global shutter mode, the shared transistor is turned off during a first period, and the shared transistor is turned on during a second period consecutive to the first period, and the first output node and the second output node are electrically connected to each other to output a pixel signal to a column line.

20. The image sensor of claim 19, wherein, based on an off state of the shared transistor, a full well capacity of the pixel array includes a sum of capacitances of the second to fourth capacitors, and based on an on state of the shared transistor, the full well capacity of the pixel array includes a sum of a capacitance of the shared transistor and capacitances of the first to fourth capacitors.

* * * * *